United States Patent [19]

Hayashi et al.

[11] Patent Number: 5,578,415
[45] Date of Patent: Nov. 26, 1996

[54] OPTICAL RECORDING MATERIALS, METHOD FOR PREPARING THE SAME AND OPTICAL CARDS HAVING THE SAME

[75] Inventors: Yoshio Hayashi; Shuichiro Ogawa; Junichi Iwata, all of Shizuoka-ken, Japan

[73] Assignee: Asahi Kasei Kogyo Kabushiki Kaisha, Osaka, Japan

[21] Appl. No.: 188,743

[22] Filed: Jan. 31, 1994

Related U.S. Application Data

[63] Continuation of Ser. No. 726,739, Jul. 2, 1991, abandoned, which is a continuation of Ser. No. 404,586, Sep. 8, 1989, abandoned.

[30] Foreign Application Priority Data

| | | | |
|---|---|---|---|
| Sep. 12, 1988 | [JP] | Japan | 63-226448 |
| Nov. 24, 1988 | [JP] | Japan | 63-294656 |
| Dec. 9, 1988 | [JP] | Japan | 63-310059 |
| Dec. 14, 1988 | [JP] | Japan | 63-313681 |
| Dec. 14, 1988 | [JP] | Japan | 63-313682 |
| Dec. 14, 1988 | [JP] | Japan | 63-313683 |
| Dec. 15, 1988 | [JP] | Japan | 63-314984 |
| Feb. 16, 1989 | [JP] | Japan | 1-35038 |
| Feb. 16, 1989 | [JP] | Japan | 1-35039 |
| Feb. 17, 1989 | [JP] | Japan | 1-36312 |
| Feb. 17, 1989 | [JP] | Japan | 1-36313 |
| Feb. 22, 1989 | [JP] | Japan | 1-40315 |
| Feb. 22, 1989 | [JP] | Japan | 1-40316 |
| Feb. 23, 1989 | [JP] | Japan | 1-41821 |
| Feb. 23, 1989 | [JP] | Japan | 1-41823 |
| Jun. 2, 1989 | [JP] | Japan | 1-139252 |
| Jun. 5, 1989 | [JP] | Japan | 1-141172 |
| Jun. 12, 1989 | [JP] | Japan | 1-146794 |
| Aug. 15, 1989 | [JP] | Japan | 1-209536 |

[51] Int. Cl.$^6$ .............................. G03C 8/28; G11B 7/24
[52] U.S. Cl. ............... 430/270.11; 430/945; 430/964; 430/247; 430/248; 430/417; 283/74; 283/77; 283/85; 346/135.1
[58] Field of Search ................ 430/247–249, 430/353, 350, 349, 626, 945, 495, 954, 417, 232, 617, 270.11; 283/74, 77, 85; 346/135.1; 369/284, 288

[56] References Cited

U.S. PATENT DOCUMENTS

| | | | |
|---|---|---|---|
| 3,234,022 | 2/1966 | Land et al. | 430/247 |
| 3,311,473 | 3/1967 | Foster et al. | 430/247 |
| 3,438,776 | 4/1969 | Yudelson | 430/247 |
| 3,457,075 | 7/1969 | Morgan et al. | |
| 3,624,284 | 11/1971 | Russell | |
| 3,656,952 | 4/1972 | Miller | 430/417 |

(List continued on next page.)

OTHER PUBLICATIONS

Fico et al. "Photothermographic Materials & Composites" RD #12013 Apr. 1974.
Hackh's Chemical Dictionary 5th ed., New York McGraw–Hill, 1987 p. 145.
M. Umehara, Patent Abstracts of Japan, vol. 7, No. 116 (M–216) [1261] (May 20, 1983).

*Primary Examiner*—Martin J. Angebranndt
*Attorney, Agent, or Firm*—Birch, Stewart, Kolasch & Birch, LLP

[57] ABSTRACT

An optical recording material comprising: a thin film or membrane of a hydrophobic binding agent; and metallic particles having a diameter of 0.003 μm to 3 μm dispersed in said film or membrane wherein the density of said metallic particles is higher near at least one surface of said film or membrane as compared with another portion of said film or membrane, each metallic particle having a nucleus and an outer coating, said outer coating consisting of at least one metal having a melting point of 250° C. to 1800° C. and a thermal conductivity at 0° C. of 5 $W \cdot m^{-1} \cdot K^{-1}$ to 450 $W \cdot m^{-1} \cdot K^{-1}$ wherein the reflectivity of the surface of said film or membrane where the density of said metallic particle is higher is 10 to 90%., a method for preparing the optical recording material and an optical card containing the optical recording material.

40 Claims, 8 Drawing Sheets

U.S. PATENT DOCUMENTS

| | | | |
|---|---|---|---|
| 3,719,490 | 3/1973 | Yudelson et al. | 430/417 |
| 3,871,887 | 3/1975 | Jones | 430/619 |
| 4,131,463 | 12/1978 | Tsuboi et al. | 96/1 E |
| 4,173,482 | 11/1979 | Akashi et al. . | |
| 4,234,679 | 11/1980 | Akashi et al. | 430/620 |
| 4,237,215 | 12/1980 | Ikenoue et al. | 430/349 |
| 4,259,424 | 3/1981 | Endo et al. | 420/620 |
| 4,269,917 | 5/1981 | Drexler et al. . | |
| 4,278,756 | 7/1981 | Bouldin et al. . | |
| 4,278,758 | 7/1981 | Drexler et al. | 430/616 |
| 4,281,060 | 7/1981 | Usami et al. | 430/353 |
| 4,284,716 | 8/1981 | Drexler et al. | 430/964 |
| 4,298,684 | 11/1981 | Bouldin et al. . | |
| 4,304,848 | 12/1981 | Bouldin et al. . | |
| 4,312,938 | 1/1982 | Drexler et al. . | |
| 4,314,260 | 2/1982 | Drexler . | |
| 4,327,176 | 4/1982 | Matsui et al. | 430/353 |
| 4,332,889 | 6/1982 | Siga et al. | 430/353 |
| 4,343,879 | 8/1982 | Drexler et al. | 430/14 |
| 4,360,728 | 11/1982 | Drexler . | |
| 4,363,870 | 12/1982 | Bouldin . | |
| 4,383,024 | 5/1983 | Bouldin . | |
| 4,396,701 | 8/1983 | Bouldin . | |
| 4,398,223 | 8/1983 | Lemelson . | |
| 4,414,273 | 11/1983 | Wada et al. | 428/336 |
| 4,463,089 | 7/1984 | Bouldin | 430/510 |
| 4,492,750 | 1/1985 | Law et al. | 430/494 |
| 4,500,777 | 2/1985 | Drexler . | |
| 4,503,135 | 3/1985 | Drexler . | |
| 4,542,288 | 9/1985 | Drexler . | |
| 4,543,307 | 9/1985 | Drexler et al. . | |
| 4,544,181 | 10/1985 | Maurer et al. | 283/74 |
| 4,544,835 | 10/1985 | Drexler . | |
| 4,572,891 | 2/1986 | Drexler . | |
| 4,588,665 | 5/1986 | Drexler . | |
| 4,603,099 | 7/1986 | Drexler . | |
| 4,609,812 | 9/1986 | Drexler . | |
| 4,634,850 | 1/1987 | Pierce et al. . | |
| 4,642,803 | 2/1987 | Drexler . | |
| 4,665,004 | 5/1987 | Drexler . | |
| 4,680,456 | 7/1987 | Drexler . | |
| 4,683,371 | 7/1987 | Drexler | 235/487 |
| 4,692,394 | 9/1984 | Drexler . | |
| 4,692,402 | 9/1987 | Bouldin et al. . | |
| 4,707,425 | 11/1987 | Sasagawa et al. | 430/21 |
| 4,711,996 | 12/1987 | Drexler . | |
| 4,734,565 | 3/1988 | Pierce et al. . | |
| 4,745,268 | 5/1988 | Drexler . | |
| 4,751,176 | 6/1988 | Phaim | 430/620 |
| 4,783,598 | 11/1988 | McAdams, Jr. | 283/85 |
| 4,786,792 | 11/1988 | Pierce et al. . | |
| 4,810,868 | 3/1989 | Drexler . | |
| 4,818,852 | 4/1989 | Haddock et al. . | |
| 4,832,992 | 5/1989 | Yabe et al. | 427/384 |
| 4,835,376 | 5/1989 | Drexler . | |
| 4,837,134 | 6/1989 | Bouldin et al. | 430/495 |
| 4,913,998 | 4/1990 | Cairncross et al. | 430/311 |
| 5,034,313 | 6/1991 | Shumar | 430/346 |

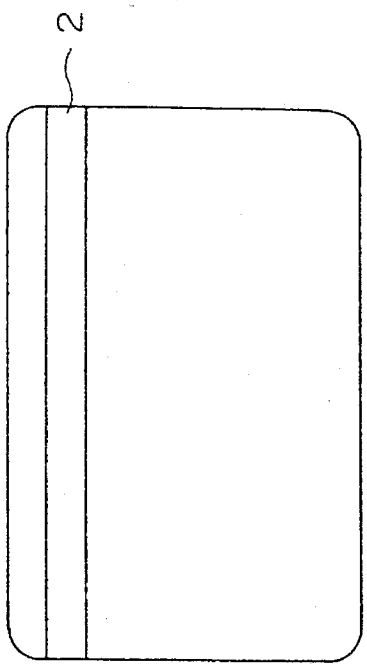
FIG. 3-(a)
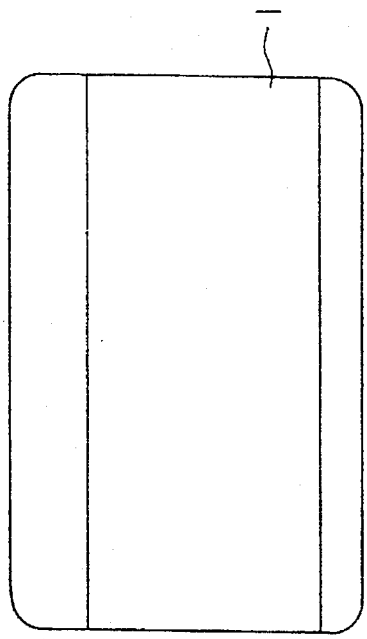
FIG. 3-(b)
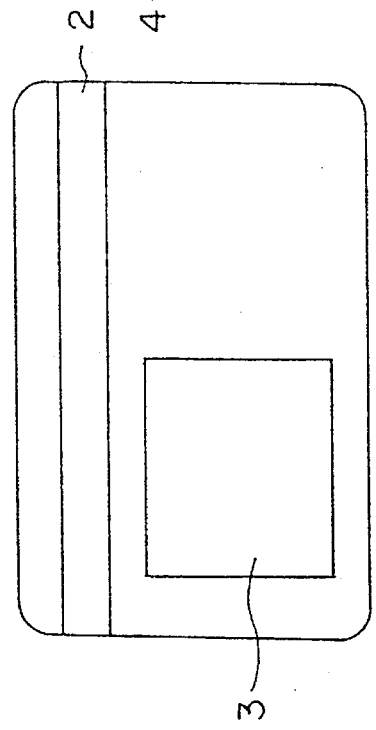
FIG. 3-(c)
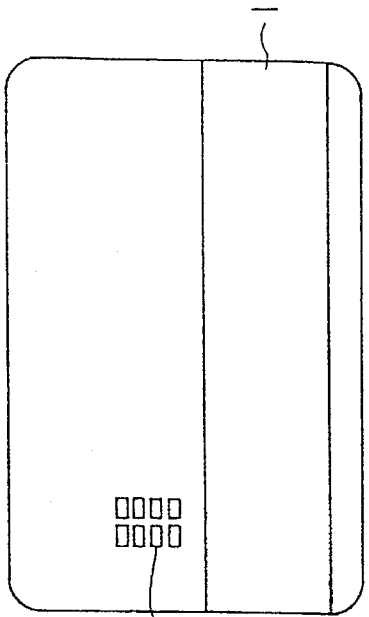
FIG. 3-(d)

FIG.6-(a)
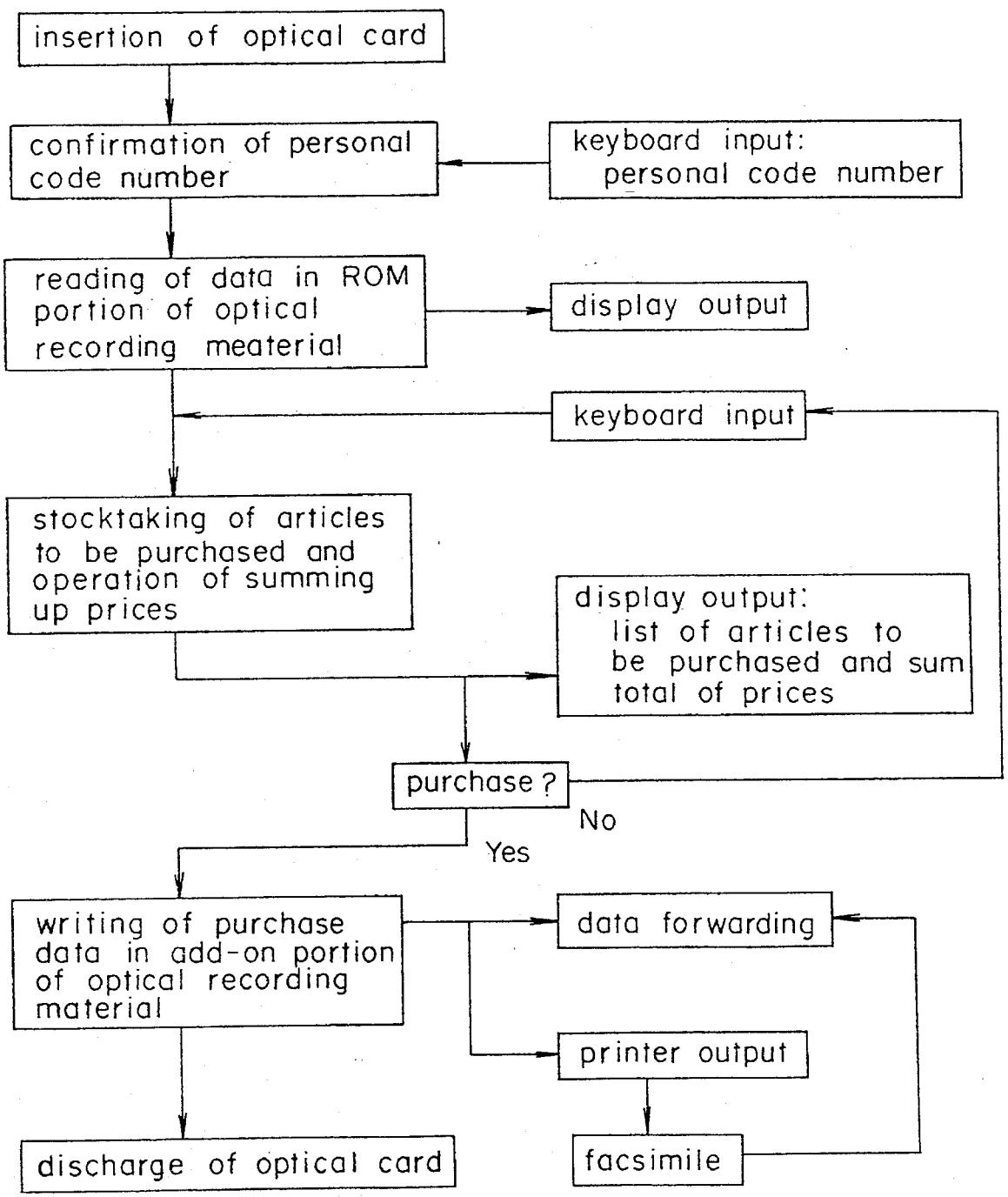

FIG.6-(b)
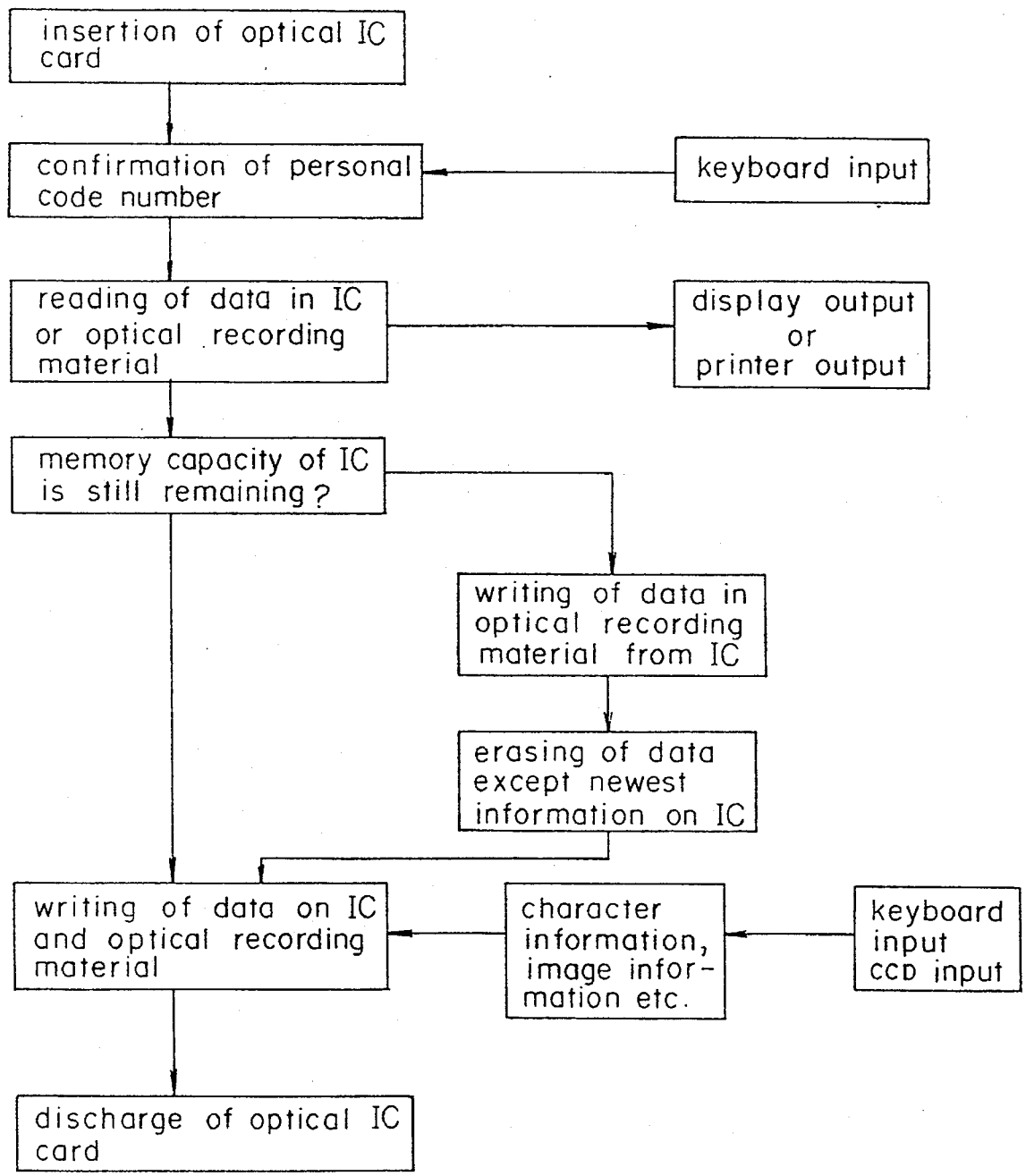

FIG. 7-(a)
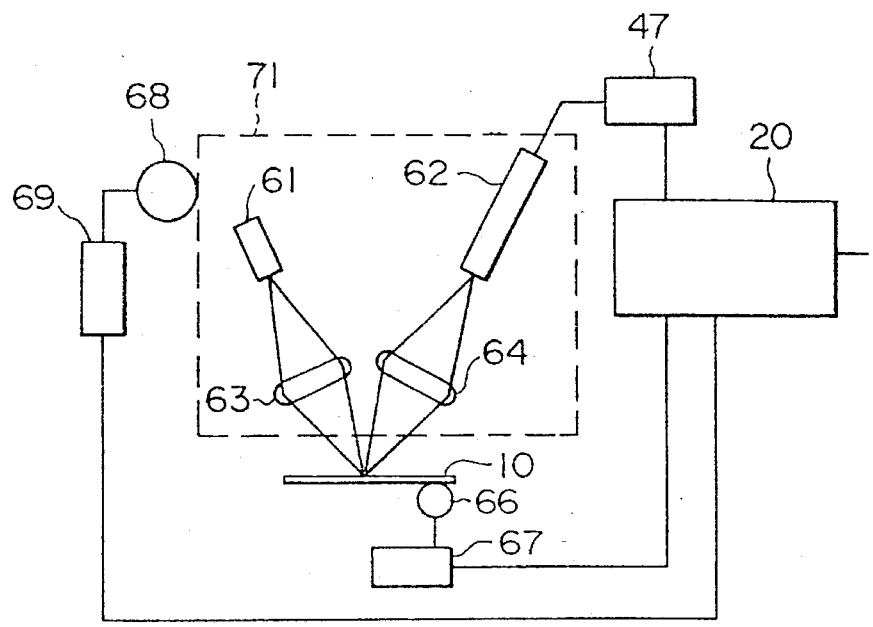
FIG. 7-(b)
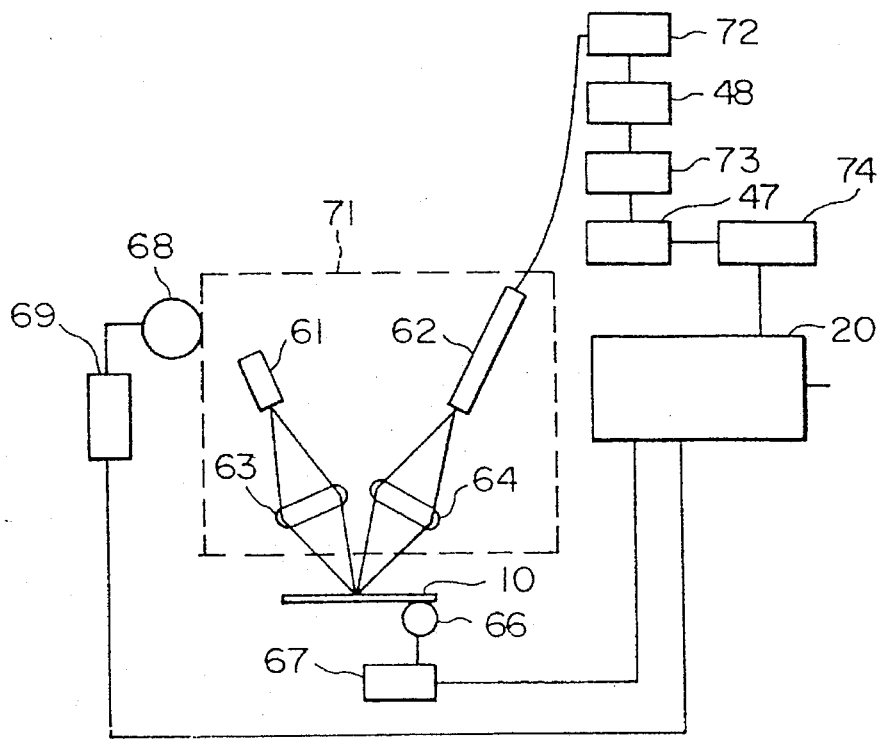

OPTICAL RECORDING MATERIALS, METHOD FOR PREPARING THE SAME AND OPTICAL CARDS HAVING THE SAME

This application is a continuation of application Ser. No. 07/726,739 filed on Jul. 2, 1991 which is a continuation of application Ser. No. 07/404,586 filed on Sep. 8, 1989, both of which are now abandoned.

BACKGROUND OF THE INVENTION

1. Field of the Invention

The present invention relates to novel optical recording materials suitable for, mainly, laser recording and reading, a method for preparing the same and optical cards having the same.

2. Description of the Prior Art

With recent remarkable progress of laser-related technologies as well as development of digitalization of information, various types of optical recording materials have been proposed.

As representative digital recording material, optical disks can be mentioned. Separately, for easy handling there have been proposed optical card materials made from high capacity flexible digital recording materials like optical disks (for example, U.S. Pat. Nos. 4,278,756; 4,463,089; and 4,692,402). Also, as the recording material in which higher capacity information can be recorded more compactly compared with optical disks there have been proposed optical tapes and further, optical floppy disk systems which are less expensive than optical disk systems. In accordance with these proposed systems various optical recording materials have been developed. When these optical recording materials are made more compact in shape or form for carrying, they are expected be exposed to very sever conditions affected by, for example, sunlight, open air temperatures, high temperatures within automobiles in summertime and high humidities due to body temperature and perspiration. However, various properties required for them such as recording sensitivity, storage stability, recording density and error bit ratio are still not sufficient. In particular, in the applications for optical cards, optical tapes and optical floppy disks which require flexibility, novel recording materials having storage stability and reliability, which can be produced by a continuous coating step suitable for mass production at low cost are eagerly desired.

SUMMARY OF THE INVENTION

An object of the present invention is to provide an optical recording material having excellent storage stability at high temperatures in an atmosphere of high humidity and sufficient resistance to severe usage conditions such as bending.

Another object of the present invention is to provide an optical recording material having excellent flexibility which can be processed in various forms such as optical cards, optical tapes, optical floppy disks and optical disks.

A further object of the present invention is to provide a method for preparing such an optical recording material at low cost.

A still further object of the present invention is to provide an optical card having such an optical recording material.

According to the present invention there are provided an optical recording material comprising: a thin film or membrane of a hydrophobic binding agent; and metallic particles having a diameter of 0.003 μm to 3 μm dispersed in said film or membrane wherein the density of said metallic particles is higher near at least one surface of said film or membrane as compared with another portion of said film or membrane, each metallic particle having a nucleus and an outer coating, said outer coating containing at least one metal having a melting point of 250° C. to 1800° C. and a thermal conductivity at 0° C. of 5 $W \cdot m^{-1} \cdot K^{-1}$ to 450 $W \cdot m^{-1} \cdot K^{-1}$ wherein the reflectivity of the surface of said film or membrane where the density of said metallic particles is higher is 10 to 90%, a method for preparing the optical recording material and an optical card containing the optical recording material.

BRIEF DESCRIPTION OF THE DRAWINGS

FIGS. 3-(a) and 3-(d) are plan views of one side of optical cards, respectively, according to the present invention and FIGS. 3-(b) and 3-(c) are plan views of the other side of optical cards, respectively, according to the present invention.

FIGS. 6-(a) and 6-(b) are flow charts for operation systems for using an optical card of the present invention.

FIGS. 7-(a) and 7-(b) are diagrams of optical, mechanical and electrical components of information reading apparatus for a ROM optical card and a ROM optical card as a voice card of the present invention, respectively.

DETAILED DESCRIPTION OF PREFERRED EMBODIMENTS

Figure 1A:
FIGS. 1-(a) and 1-(b) are transmission electron microscopic photographs of the cross section of one of the optical recording materials of the present invention at different magnifications.

According to the optical recording material of the present invention the thin film or membrane of a hydrophobic binding agent has, in its at least one surface, a metallic luster layer of higher reflectivity where metallic particles having a diameter of 0.003 μm to 3 μm are present as uniformly dispersed particles or as a uniform continuous layer at a higher density compared with another layer of lower reflectivity contiguous to the metallic luster layer, and between the metallic luster layer and the layer contiguous to the metallic luster there may or may not exist a clear boundary.

For laser recoding and reading, the reflectivity of the metallic luster layer of the optical recording material of this invention is preferably high from the viewpoint of designing a detection system. However, when the reflectivity is too high, the metallic layer cannot efficiently absorb the laser power. Accordingly, the reflectivity is typically 10 to 90% for practical purposes and preferably 25 to 60%.

Further, for designing a laser recording and reading system, it is preferred that the optical difference between the recorded portion and the surrounding unrecorded portion is greater. Thus it is preferred that the metallic luster layer of the optical recording material of the present invention and the layer contiguous to the metallic luster layer has the following relationship;

$$0.03 \leq \frac{X-Y}{X+Y} \leq 0.9$$

wherein
X is a reflectivity of the metallic luster layer; and
Y is a reflectivity of the layer contiguous to the metallic luster layer.

When the value X−Y/X+Y is less than 0.03, the optical contrast between the recorded portion and the surrounding unrecorded portion is low and error tends to occur in reading the recorded portion. On the other hand, the value X−Y/X+Y is preferably greater in recording information but it is difficult to obtain optical recording material having a value of X−Y/X+Y of above 0.9 and at the same time recordable sensitivity for practical purposes.

Furthermore, for more easily designing a laser recording and reading system, it is more preferred that the metallic luster layer of the recording material of the present invention and the layer contiguous to the metallic luster layer has the following relationship;

$$0.2 \leq \frac{X-Y}{X+Y} \leq 0.8$$

It is preferred that the optical recording materials of the present invention are thinner as long as the difference in reflectivity between the metallic luster layer and the layer contiguous to the metallic luster layer can be obtained from the viewpoint of improving the recording density and the thickness of the optical recording material is typically 1 to 20 μm.

In the present invention the reflectivity is represented by a ratio of the percentage of the intensity of a reflected beam at a right reflected angle of −75 degrees to that of an incident beam at an incident angle of 75 degrees, and the wavelength of the beam which is employed for the measurement of the reflectivity is 830 nm.

In addition, the thin film or membrane of a hydrophobic binding agent may contain a light absorber in the range of wavelengths of a semiconductor laser to increase the sensitivity and Y-value in laser recording and to increase the optical contrast. The light absorber may be provided as a layer on the metallic luster layer.

Also, the thin film or membrane of a hydrophobic binding agent may contain a silver halide or silver halide-forming agent and additives such as a toning agent, an anti-fogging agent and a sensitizer.

The optical recoding material of the present invention can be used by itself or can be provided on a substrate which may be transparent, translucent or opaque and rigid or flexible.

Further, in order to protect the optical recording material of the present invention, a transparent protective layer can be laminated on the optical recording material by heating or with an adhesive.

Also, in order to reinforce the optical recording material against, for example, bending, a reinforcing layer can be laminated on the substrate.

The metallic particles have a nucleus and an outer coating and the metal of the outer coating of the metallic particles which can be employed in the present invention has a melting point of 250° C. to 1800° C. and a thermal conductivity at 0° C. of 5 W·m$^{-1}$·K$^{-1}$ to 450 W·m$^{-1}$·K$^{-1}$. When the melting point of the metal is below 250° C., the stability of the metallic luster layer tends to decrease. On the other hand, when the melting point is above 1800° C., the sensitivity of the metallic luster layer in laser recording or writing is decreased. Also, when the thermal conductivity at 0° C. is less than 5 W·m$^{-1}$·K$^{-1}$, the shape of pits becomes disturbed in laser recording to increase bit error ratio for practical purposes and when the thermal conductivity at 0° C. is greater than 450 W·m$^{-1}$·K$^{-1}$, the sensitivity of the metallic luster layer in laser recording is remarkably decreased.

Exemplary metals of the outer coating of the metallic particles include silver, gold, copper, tellurium, bismuth, palladium, cobalt, nickel, lead, chromium and titanium. Of these metals silver is preferred.

The metal of the nucleus of the metallic particles is a metal of the outer coating, a metal more precious than the metal of the outer coating, an alloy thereof, a sulfide thereof or an oxide thereof.

Exemplary metals more precious than the metal of the outer coating include silver, palladium, platinum, gold, rhodium, ruthenium thallium, mercury, and alloy thereof, a sulfide thereof and an oxide thereof. Of these metals, silver is preferred.

The preparation of the optical recording materials of the present invention will now be explained.

A uniform solution or suspension of the composition for the optical recording material of the present invention is prepared by uniformly dissolving or dispersing an organic metal compound capable of forming metallic particles alone or together with a compound capable of reducing the organic metal compound (herein referred to as "reducing agent"), and a hydrophobic binding agent in a solvent.

The organic metal compounds capable of forming metallic particles which can be employed in the present invention include organic metal salts, organic metal complexes and organic metal chelate compounds whose metal is silver, gold, copper, tellurium, bismuth, palladium, platinum, rhodium, cobalt, nickel, lead, chromium or titanium. Of these compounds, organic silver compounds are preferred.

The organic silver compounds capable of forming metallic silver by reduction which can be employed in the present invention include low molecular weight silver compounds which may be soluble or insoluble in an organic solvent or the hydrophobic binding agent and high molecular weight silver compounds.

Exemplary low molecular weight silver compounds include silver salts of carboxylic acids such as silver acetate, silver pyruvate, silver citrate, silver oxalate, silver benzoate and silver 2-ethylhexanoate; silver salts of long chain carboxylic acids such as silver behenate, silver stearate, silver palmitate, silver myristate, silver laurate, silver oleate, silver margarate, silver arachidate, silver cerotate and silver milissinate; silver salts of perfluorocarboxylic acids such as silver trifluoroacetate, silver pentafluoropropionate, silver heptafluoro-n-butyrate, silver heptafluoroisobutyrate, silver nonafluoropivalate, silver nonafluoro-n-valerate and nonafluoroisovalerate; silver salts of perfluorocarboxylic acids whose fluorine atoms are partially substituted with chlorine atom; silver salts of sulfonic acids or sulfinic acids such as silver phenyldiazosulfonate and silver sulfinate; silver chelate compounds formed by fluorine-containing chelating agents such as thenoyltrifluoroacetone, heptafluorobutanoylpivaloylmethane, pivaloyltrifluoroacetone, trifluoroacetylacetone, furoyltrifluoroacetone and hexafluoroacetylacetone; and silver thiocarbamates such as diethyldithiocarbamate; silver chelate compounds such as silver 5-chlorosalicylaldoxime and silver 5-nitrosalicylaldoxime; silver salts of nitrogen-containing compounds such as silver salt of saccharin and silver salt of benzotriazole; silver salts complexed with coordination compounds such as silver nitrate, silver cyanate, silver phosphate and a silver salt of a carboxylic acid such as silver acetate, silver citrate, silver 2-ethylhexanoate or silver trifluoroacetate complexed with imidazole, 2-ethylimidazole, 1-methylimidazole, 2,4-dimethylimidazole, pyridine, 2-methylpyridine, 2,4-dimethylpyridine or phenylmethyl sulfide. Of these compounds, the silver salts of the long chain carboxylic acids and the silver salts of the perfluorocarboxylic acids are preferred and silver behenate are trifluoroacetate are more preferred.

Exemplary high molecular weight silver compounds include silver salts of high molecular weight polycarboxylic acids derived from silver ion compounds such as silver nitrate and polymers of acrylic acid, methacrylic acid or an alkali or alkaline earth metal salt of acrylic acid or methacrylic acid or copolymers of acrylic acid, methacrylic acid or the alkali or alkaline earth metal salt of acrylic acid or methacrylic acid with a copolymerizable monomeric compound such as styrene, a $C_{1-8}$ alkyl acrylate, a $C_{1-8}$ alkyl methacrylate, acrylonitrile, vinyl acetate, vinyl chloride and vinylidene chloride; silver salts of polycarboxylic acids such as silver alginate and silver pectate; and high molecular weight silver chelate compounds such as polymers having a chelate-forming ligand in the main chain or in the side chain including a β-diketone ligand represented by the formula,

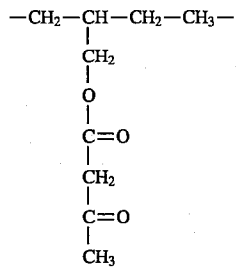

aromatic polyketones represented by the formula

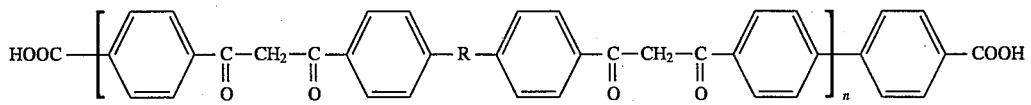

wherein R is —O— or —CH$_2$—, aromatic polyhydroxyl compounds, aromatic hydroxycarbonyl compounds represented by the formula,

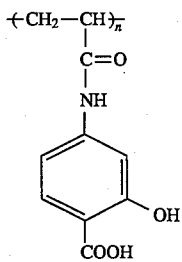

polyvinyl amine, 3-vinylaniline polymer, oxime compounds represented by the formulae

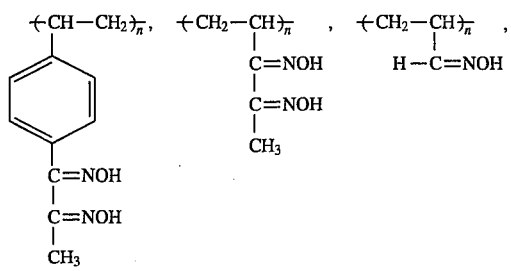

polymeric Schiff bases, polypeptides having a chelate-forming group in the side chain, ethanolamine resins obtained by the reaction of chloromethylated polystyrene and diethanolamine, aminophenols, polymers of heterocyclic compounds such as a polymer obtained by the copolymerization of 5-(hydroxymethyl)-8-quinoline allyl ether, methyl methacrylate and styrene, and high molecular weight azo compound. When the silver salts of the high molecular weight polycarboxylic acids are employed, the whole or part of the hydrophobic binding agent can be replaced by them. Also when the silver salts of the polycarboxylic acids are employed, metallic silver is formed by heating and at the same time the polymer skeleton becomes hydrophobic by decarboxylation.

The organic metal compounds whose metal is a metal other than silver, that is, gold, copper, tellurium, bismuth, palladium, platinum, rhodium, cobalt, nickel, lead, chromium or titanium and which can be employed in the present invention are the above described organic silver compounds whose metal is replaced by the metal other than silver. However, the organic metal compounds whose metal is more precious than silver, that is, gold, palladium, platinum or rhodium are employed together with a reducing agent having an equal or weaker reducibility against the organic silver compound, and those whose metal is less precious than silver, that is, copper, tellurium, bismuth, cobalt, nickel, lead, chromium or titanium are employed together with a reducing agent having a stronger reducibility against the organic silver compound such as ascorbic acid and stannous chloride. Further, the latter can be reduced to metals by the photo reducibility of ferric oxalate or by self-decomposition under heating in the form of the metal salts of oxalic acid.

The reducing agents which can be employed in the present invention can be chosen depending upon the kind of the organic metal compound employed in combination therewith and include monohydroxybenzenes such as p-phenylphenol and p-methoxyphenol; polyhydroxybenzenes such as hydroquinone, tert-butylhydroquinone, 2,6-dimethylhydroquinone, chlorohydroquinone and catechol; naphthols such as α-naphthol, β-naphthol, 4-aminonaphthol and 4-methoxynaphthol; hydroxybinaphthyls such as 1,1'-dihydroxy-2,2'-binaphthyl and 4,4'-dimethoxy-1,1'-dihydroxy-2,2'-binaphthyl; hydroxylamines such as phenylhydroxylamine and benzylhydroxylamine; pyrazolidones such as 1-phenyl-3-pyrazolidone; phenylenediamines such as p-phenylenediamine and N,N'-dimethyl-p-phenylenediamine; aminophenols such as N-methyl-p-aminophenol and 2,4-diaminophenol; sulfamidophenols such as p-(p-toluenesulfamido)phenol and 2,6-dibromo-4-(p-toluenesulfamido)phenol; ascorbic acid; stannous chloride and hindered phenols in which one or two sterically bulky groups are bonded to the carbon atom or carbon atoms to sterically hinder the hydroxy group.

Examples of such hindered phenols include 2,6-di-tert-butyl-4-methylphenol, 2,5-di-tert-butyl-4-methoxyphenol, 2,2'-methylenebis(4-methyl-6-tert-butylphenol), 2,2'-methylenebis(4-ethyl-6-tert-butylphenol), trimethylpentylbis(2-hydroxy-3,5-dimethylphenyl)methane, 2,6-methylenebis(2-hydroxy-3-tert-butyl-5-methylphenyl)-4-methylphenol, 2,2'-methylenebis[4-methyl-6-(1-methylcyclohexyl)phenol], 1,1-bis(2-hydroxy-3,5-dimethylphenyl)-3,5,5-trimethylhexane, 2,6-bis(2'-hydroxy-2'-tert-butyl-5'-methylbenzyl)-4-methylphenol and 1,1-bis(2-hydroxy-3-tert-butyl-5-methylphenyl)pentane, triethylene glycol bis[3-( 3-tert-butyl-5-cyclohexyl-4-hydroxyphenyl)propinate], 1,6-hexanediol bis[3-(3,5-di-tert-butyl-hydroxyphenyl) propionate, 2,4-bis(n-octylthio)-6-(4-hydroxy-3,5-di-tert-butyl-anilino)-1,3,5-triazine, pentaerythrityltetrakis[3- (3,5-di -tert-butyl-4-hydroxyphenyl)propionate, 2,2-thiodiethylenebis[3-(3,5-di-tert-butyl-4-hydroxyphenyl)propionate, octadecyl-3-(3,5-di-tert-butyl-4-hydroxyphenyl)propionate, N,N'-hexamethylenebis (3,5-di-tert-butyl-4-hydroxyphenyl)cinnamide, 3,5-di-tert-butyl-4-hydroxybenzyl phosphonate diethyl ester, 1,3,5-trimethyl-2,4,6-tris(3,5-di-tert-butyl-4-hydroxybenzyl phosphonate ethyl ester) calcium, tris(3,5-di-tert-butyl-4-hydroxybenzyl)isocyanurate, N,N'-bis[3-(3, 5-di-tert-butyl-4-hydroxyphenyl)propionyl]hydrazine, 2,2'-ethylydenebis(4,6-tert-butylphenol) and 2,2'-ethylydenebis(4,6-di-methyl-1-cyclohexylphenol); the compounds represented by the formula,

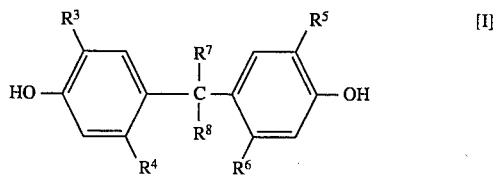

wherein
$R^3$, $R^4$, $R^5$ and $R^6$ each is a $C_{1-8}$ alkyl group or a halogen atom; and
$R^7$ and $R^8$ each is a hydrogen atom, a phenyl group or a $C_{1-8}$ alkyl group, and
the compounds represented by the formula,

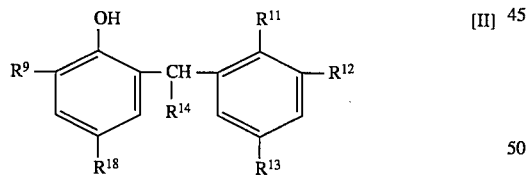

wherein
$R^9$ is a $C_{4-10}$ secondary or tertiary alkyl group, a cyclohexyl group or a cyclohexyl group substituted with a $C_{1-6}$ alkyl group;
$R^{10}$ is a $C_{1-6}$ alkyl group;
$R^{11}$ is a $C_{1-10}$ alkyl group, a $C_{1-10}$ alkoxy group, a $C_{6-12}$ aryl group, a $C_{2-10}$ alkenyl group or a group linked with a $C_{1-10}$ alkyl group, a $C_{6-12}$ cycloalkyl group, a $C_{2-10}$ alkenyl group, a $C_{6-12}$ aryl group or a $C_{7-12}$ aralkyl group through an ester bond;
$R^{12}$ is a $C_{1-6}$ alkyl group or a $C_{1-6}$ alkoxy group;
$R^{13}$ is a $C_{1-6}$ alkyl group; and
$R^{14}$ is a hydrogen atom or a $C_{1-6}$ alkoxy group.

In formula [I] suitable examples of the $C_{1-8}$ alkyl groups include a methyl, ethyl, sec-butyl, tert-butyl, cyclohexyl group, cyclopentyl group, iso-amyl, tert-amyl and 2-ethylhexyl group and suitable examples of the halogen atoms include a chlorine, bromine and iodine atom.

Exemplary compounds represented by formula [I] include:

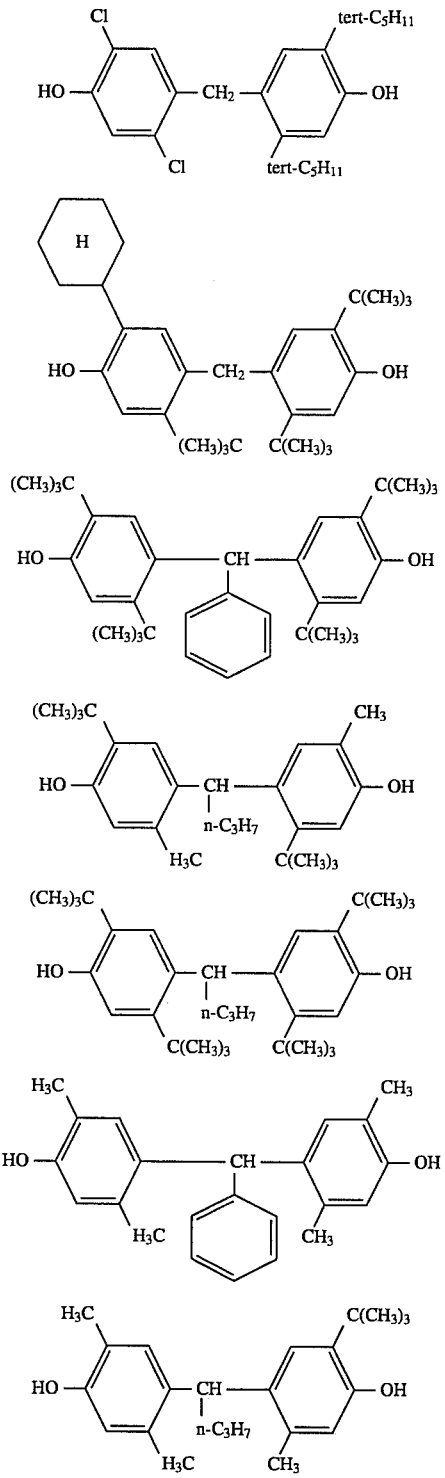

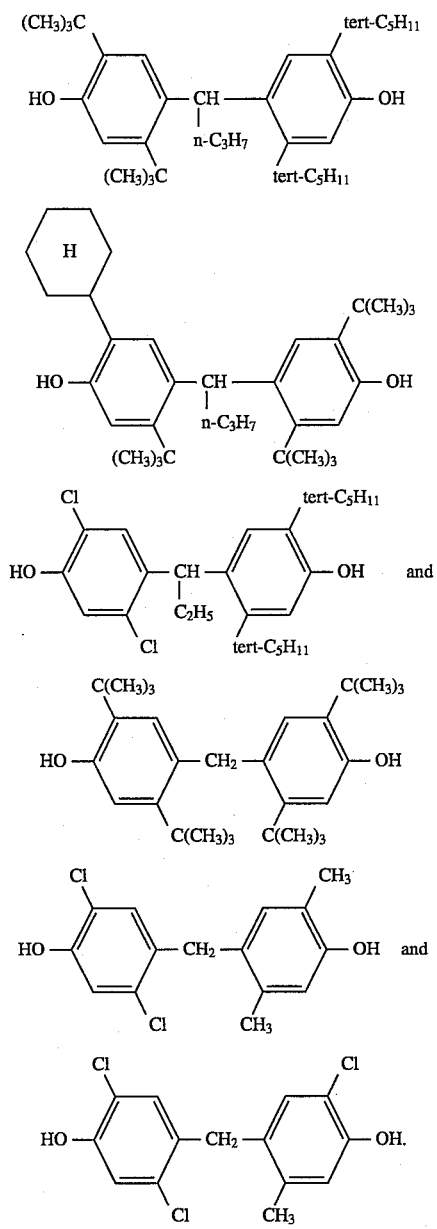
Exemplary compounds represented by formula [II] include:
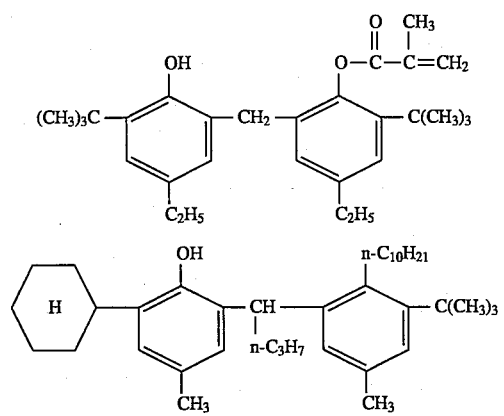
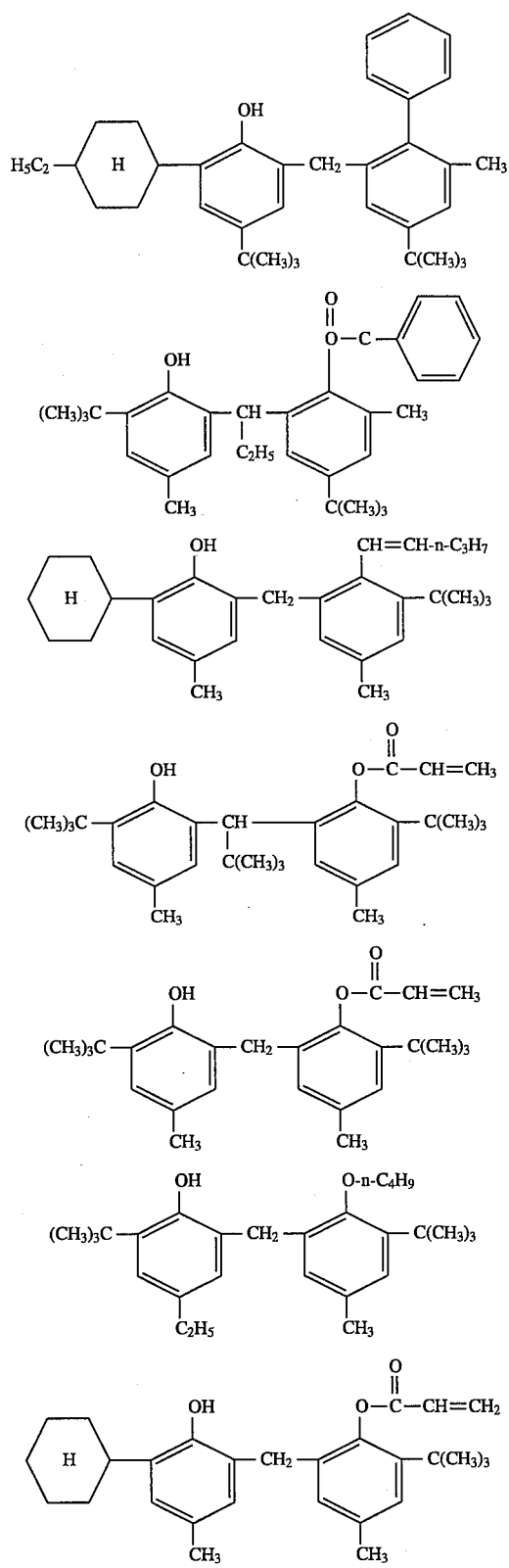

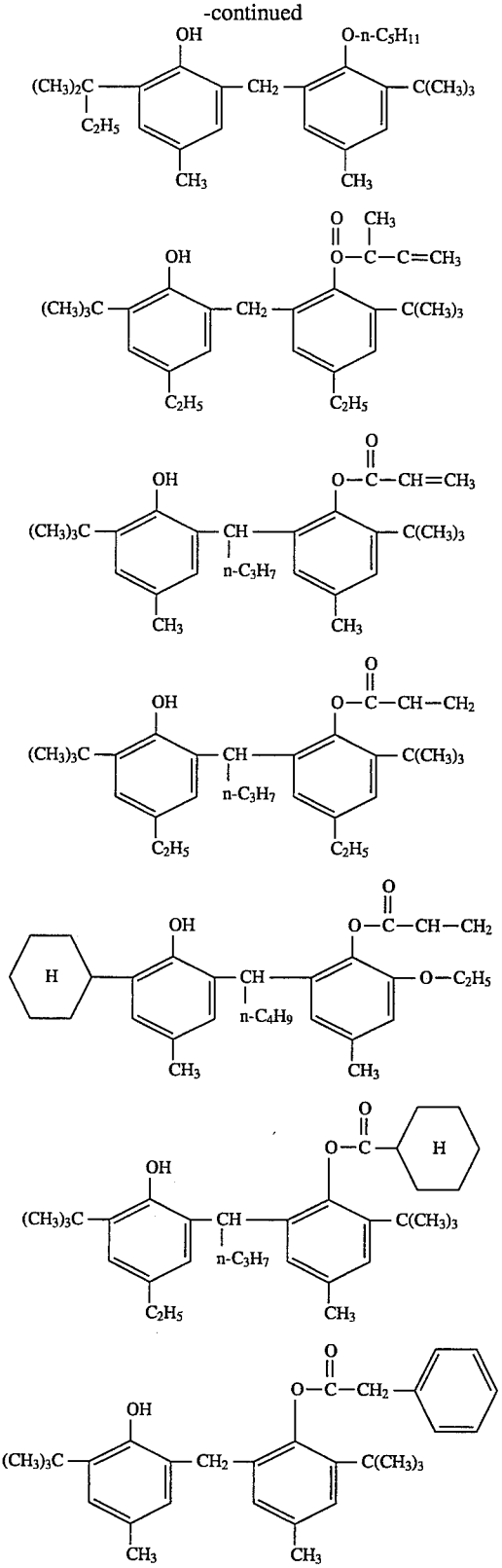

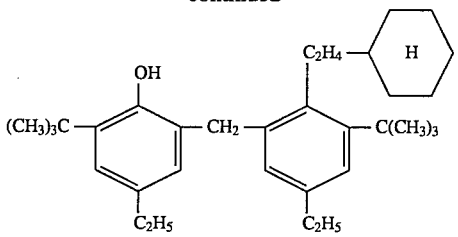

Of these reducing agents, preferred are phenols and more preferred are hindered phenols.

The amount of the reducing agent should be selected depending upon the organic metal compound employed and is typically 0.01 to 10 mols, preferably 0.1 to 3 mols per mol of the organic metal compound.

The hydrophobic binding agent which can be employed in the present invention is an organic polymeric compound which is insoluble in water or warm water of 60° C. and has a glass transition temperature of, typically, 10° C. to 140° C. and, preferably, 40° C. to 110° C.

Exemplary organic polymeric compounds include polyvinyl formal, polyvinyl butyral, polyvinyl acetate, vinyl chloride-vinyl acetate copolymer, cellulose acetate, cellulose acetate propionate, cellulose acetate butyrate, polystyrene, styrene-acrylonitrile copolymer, styrene-methyl methacrylate copolymer, styrene-butadiene copolymer, polybutadiene, linear polyurethane, polyvinyl chloride, polyvinylidene chloride, polycarbonate, polyisobutylene, polyethylene adipamide, a variety of linear polyesters such as polyethylene terephthalate and poly-1,4-butylene terephthalate, polymethyl methacrylate and its similar resins of methyl, ethyl, n-butyl, isobutyl, tert-butyl, 2-ethylhexyl, isodecyl, n-lauryl, cyclohexyl acrylate or methacrylate and resins containing monomers copolymerizable with the resin forming monomers such as vinyl acetate, vinyl chloride, vinylidene chloride, styrene, butadiene, ethylene, vinyl ether, maleic anhydride or acrylonitrile.

The amount of the hydrophobic binding agent which can be employed in the present invention is typically 10 to 1000 parts by weight based on 100 parts by weight of the organic metal compound.

Suitable examples of the solvent include alcohols such as methyl alcohol, ethyl alcohol, isopropyl alcohol, n-butyl alcohol, isobutyl alcohol; ketones such as methyl ethyl ketone, methyl propyl ketone, methyl isobutyl ketone, acetone; ethers such as ethyl ether, isopropyl ether, ethyl-n-butyl ether, dioxane; esters such as ethyl formate, methyl acetate, ethyl acetate; aliphatic hydrocarbons such as n-hexane, n-hepatane, cyclohexane; aromatic hydrocarbons such as toluene, xylene; and halogenated aliphatic hydrocarbons such as chloroform, dichloroethane.

The composition for the optical recording material may contain a silver halide or a silver halide-forming compound.

The silver halides or the silver halide-forming compounds which can be employed in the present invention include silver halides such as silver chloride, silver bromide, silver iodide, silver iodobromide, silver chlorobromide; hydrogen halides such as hydrogen chloride, hydrogen bromide, hydrogen iodide; metal chlorides such as lithium chloride, sodium chloride, potassium chloride, calcium chloride, barium chloride, aluminum chloride, iron chloride, zinc chloride, cobalt chloride, lead chloride, mercury chloride, nickel chloride, cadium chloride, manganese chloride, magnesium chloride; metal bromides and metal iodide corresponding to these metal chlorides; halogen molecules such as molecular iodine, molecular bromine, bromine iodide and organic complexes of halogen molecules; organic N-haloamides such as N-bromosuccinimide, N-bromoacetamide, N-bromophthalazone, N-bromophthalimide, N,N-dibromobenzene-sulfonamide; diaryl halomethanes such as α-bromodiphenylmethane, α-bromodi(p-nitrophenyl) methane, α-bromodi(p-methoxyphenyl)methane, α-bromodi(p-bromophenyl)methane, α-bomodi(p-methylphenyl)methane; ammonium halides such as benzyltrimethylammonium iodide, benzyltrimethylammonium bromide and ethyltrimethylammonium bromide; organic halide compounds of elements of Groups IV, V and VI of Periodic Table such as triphenylphosphine dibromide, bis (p-anysyl)tellurium dibromide diphenylgermanium dibromide, triphenyltin bromide and diphenylsellenium dibromide; dihalides of triphenyl phosphite such as dibromide of triphenyl phosphite and diiodide of triphenylphosphite.

The amount of the silver halide or the silver halide forming compound which can be employed in the present invention is typically 0.01 to 0.5 mol per mol of the organic metal compound.

Further, in order to increase the sensitivity and γ-value of the optical recording material in writing or recording information and to increase the contrast in reading or retrieving the information recorded, the composition for the optical recording material may contain a light absorber in the range of wavelengths of semiconductor lasers, i.e., 650 nm to 900 nm.

Examples of such light absorbers include cyanine dyes, merocyanine dyes, oxonol dyes, styryl dyes, rhodacyanine dyes, hemicyanine dyes, styryl quinoline dyes, phthalocyanine dyes, naphthalocyanine dyes, xanthene dyes, anthraquinone dyes, triphenylmethane dyes, naphthoquinone dyes, azulenium dyes, squarylium dyes, croconylium dyes and nickel-dithiol complexes. Of these dyes, phthalocyanine dyes, naphthalocyanine dyes, nickel-thiol complexes and azulenium dyes are preferred since these dyes are light absorbers having good weatherability against the light having a wavelength of semiconductor lasers. Exemplary such dyes include aluminum phthalocyanine, copper phthalocyanine, iron phthalocyanine, cobalt phthalocyanine, nickel phthalocyanine, zinc phthalocyanine, titanium phthalocyanine, aluminum fluoride phthalocyanine, magnesium phthalocyanine, cobalt naphthalocyanine, nickel naphthalocyanine, titanium naphthalocyanine, magnesium naphthalocyanine, aluminum fluoride naphthalocyanine and ethylene-1,2-dithiol nickel complex.

The amount of the light absorber which can be employed in the present invention is 2 to 50 parts by weight based on 100 parts by weight of the organic metal compound.

Furthermore, the composition for the optical recording material may contain a variety of additives in order to improve the property of the optical recoding materials. For example, in order to control the desired growth of the size of metallic particles, particularly metallic silver particles, a toning agent such as phthalazone, an anti-fogging agent such as a mercury compound and a light decomposable organic halogen compound such as 1,1,1',1',-tetrabromo-o-xylene and 1,2,3,4,-meso-tetrabromobutane, and a sensitizer such as 2,3-dimethyl-1-phenyl-3-pyrazolin-5-one and N-methyl-2-pyrrolidone can be added as the additive. The amount of each of the additives is typically 0.01 to 0.5 mol per mol of the organic metal compound.

The solution or suspension of the composition for the optical recording material is coated on a substrate and dried.

The coating may be conducted by a brush or coater such as a reverse roll coater, curtain coater, gravure coater, doctor blade coater or bar coater.

The substrate may be any film, sheet or plate capable of guaranteeing the smoothness of the surface of the optical recording material and may be transparent, translucent or opaque and rigid or flexible.

Examples of such rigid sheets or plates include sheets or plates of metals such as aluminum and copper or glass, and examples of such flexible films or sheets include films or sheets of plastics such as polyethylene terephthalate, polyimide, cellulose acetate or polyfluoroethylene.

The drying of the coated layer is typically conducted in air at a temperature of 15° C. to 130° C. or in a stream of a gas inert to the composition for the optical recording material such as air, nitrogen as, carbon dioxide gas, hydrogen gas, oxygen gas, helium gas or argon gas at room temperature of 15° C. to 130° C.

Then a thin layer of the metal of the organic metal compound or a metal more precious than the metal of the organic metal compound is formed on the surface of the coated layer of the composition for the optical recording material.

The metal more precious than the metal of the organic metal compound means a metal capable of acting as a reaction site or as a catalytic nucleus for the metal of the organic metal compound to form metallic particles. More specifically, the formation of metallic particles by self-decomposition under heating or by reduction under heating remarkably progresses at the site where the metal more precious than the metal of the organic compound is present and as the result, the metallic particles can be formed at a higher density at the site where the metal more precious than the metal of the organic metal compound is present compared with another site where it is absent.

Exemplary metals more precious than the metal of the organic metal compound which can be employed in the present invention include silver, palladium, platinum, gold, rhodium, ruthenium, thallium, mercury, alloys thereof, sulfides thereof and oxides thereof.

When the organic metal compound is an organic silver compound, silver palladium, platinum, gold, silver oxide and silver sulfide can be employed as the metal more precious than the metal of the organic metal compound.

Exemplary methods of forming the thin layer of the metal of the organic metal compound or the metal more precious than the metal of the organic metal compound on the surface of the layer of the composition for the optical recording material which can be employed in the present invention include (1) an electroless plating deposition method of providing, for example, palladium on the surface of the layer by immersing the layer in, first, an aqueous stannous chloride solution and, second, an aqueous palladium chloride solution or of providing, for example, silver on the surface of the layer by immersing the layer in, first, an aqueous stannous chloride solution and second, an aqueous silver nitrate solution; (2) a method of vacuum-evaporating a metal such as platinum, gold, silver or palladium on the surface of the layer; (3) a method of coating a dispersion of the metal of the organic metal compound or the metal more precious than the metal of the organic metal compound in a solvent containing an appropriate binding agent on the surface of the layer; (4) a method of fogging the surface of the layer with a strong reducing agent such as ascorbic acid; (5) a method of providing a silver sulfide-forming compound such as sodium sulfide on the surface of the layer; and (6) a method of exposing the surface of the layer containing, for example, an organic silver compound to a reducing gas such as hydrogen gas for a short time to form silver on the surface of the layer.

The thickness of the thin layer of the metal nuclei is typically 2 to 1000 Å and preferably 10 to 200 Å.

Then the layer of the composition for the optical recording material having the thin layer of the metal of the organic metal compound or the metal more precious than the metal of the organic metal compound in its surface is subjected to heating typically at a temperature of 50° C. to 200° C. for one second to 5 minutes, preferably at a temperature of 70° C. to 160° C. for two seconds to 100 seconds, resulting in a metallic luster layer of metallic particles having a diameter of 0.003 μm to 3 μm at a higher density in the surface of the layer. The heating conditions should be optimally controlled for satisfying the necessary properties of the optical recording material of the present inventions.

Further, the metallic luster layer can be formed at the inteface between the substrate and the layer of the composition by forming a thin layer of the metal more precious than the metal of the organic metal compound on the substrate in the same manner as described above and subsequently coating the solution or suspension of the composition for the optical recording material on the substrate in the same manner as described above. Also two metallic luster layers can be formed at the surface of the layer of the composition and at the interface between the substrate and the layer of the composition, respectively, by, first, forming a thin layer of the metal more precious than the metal of the organic metal compound on the substrate, second, coating the solution or suspension of the composition for the optical recording material on the substrate and, third, forming a thin layer of the metal more precious than the metal of the organic metal compound on the surface of the coated layer in the same manner as described above.

According to the present invention the information to be retrieved can be prerecorded in a part of or in the entire optical recording material by exposing the layer of the composition for the optical recording material having the thin layer of a metal more precious than the metal of the organic metal compound at its at least one surface through a photomask bearing information such as a preformat to a light having an exposure energy of $10^{-7}$ J/cm$^2$ to $10^{-2}$ J/cm$^2$ for 5 to 20 seconds before the heating procedure or by exposing the metallic luster layer in at least one surface of the optical recording material through a photomask bearing information such as a preformat to a light having an exposure energy of $10^{-1}$ J/cm$^2$ to $10^5$ J/cm$^2$ for 100 μseconds to 10 seconds after the heating procedure.

Light sources which can be employed in the light exposure include a super high pressure mercury lamp, a halogen lamp, a xenon-mercury lamp, a tungsten lamp, a xenon flash lamp, an electrodeless lamp and a krypton lamp and lasers. For the light exposure after the heating procedure, of these light sources, a xenon flash lamp is preferred from the viewpoint of obtaining a high exposure energy at a short period of time and an excellent resolution, resulting in a high producibility of photo-recording in the light exposure of the metallic luster layer in at least one surface of the optical recording material.

Further, in order to protect the optical recording material, a transparent protective layer can be laminated on the metallic luster layer of the optical recording material by heating or with an adhesive such as a urethane resin and an epoxy resin.

Exemplary transparent protective layers include films or sheets of organic polymeric compounds such as polycarbonate, polystyrene, polymethyl methacrylate, polyvinyl chloride, polyvinylidene chloride and polyethylene terephthalate.

Also, in order to reinforce the optical recording material against bending, the substrate can be laminated with a sheet or film of a metal such as stainless steel, aluminum and copper, a glass fiber reinforced sheet or film, a carbon fiber sheet or film or a ceramic sheet or film.

The optical recording materials having a metallic luster layer in its at least one surface can be employed with the substrate or without the substrate by removing the substrate after the heating procedure.

The optical recording material of the present invention may be in the form of a card, a disk or a tape.

The optical recording materials of the present invention are recordable by a variety of laser beam sources having an appropriate power, and typically by a He-Ne laser and a semiconductor laser having an emission power of 5 to 15 mW and a beam diameter of 1 to 10 μm at a scanning rate of 10 cm per second to 3 m per second.

The recording or writing of information can be conducted either from the side of a higher reflectivity of the optical recording material or from the side of a lower reflectivity of the optical recording material. Also, the pits formed may be holes where part of the optical recording material is ablated, concaves formed by difference in surface tension or bubbles so as to change the reflectivity before or after the irradiation by at least 10%.

According to the present invention the optical recording material of the present invention can be prepared in a continuous manner at low cost. More specifically, industrial production means such as continuous coating of the solution or suspension of the composition for the optical recording material on a substrate by a roll coater and continuous heating of the coated layer by a heat roll or a hot air stream can be employed in the production of the optical recording material of the present invention and as the result, the cost of the optical recording material can be reduced.

The optical recording materials of the present invention are especially suitable for optical cards, and optical cards having the optical recording materials of the present invention will be explained with reference to the drawings.

In FIGS. 3-(a), 3-(b), 3-(c) and 3-(d) numeral 1 is an optical recording material of the present invention, numeral 2 is a magnetic material, numeral 3 is analog information and numeral 4 is an integrated circuit unit having 8 terminals whose positions are provided in accordance with JBMS-38-1988 of Japan Business Machine Makers Association.

When the optical card is employed as a financial transaction card such as a banking card, the name of the subject, the account number and the personal code number is prerecorded on the stripe of the magnetic recording material 2 and numeral 3 is any analog information such as a notified seal or signature, a face photograph or a fingerprint and any other information which can identify the owner of the optical card. By presentation of the optical card at a teller's window of a bank, the owner can be confirmed by this analog information. When the optical card is employed at a bank, the information such as the date of deposit or withdrawal of a bank account, the amount of money and the balance information is recorded on the stripe of the optical recoding material 1 as a dot, pit or spot row by a laser beam.

When the optical card is employed as a medical information card such as a health examination card, the owner's name, the health examination number and the owner's code number are prerecorded on the stripe of the magnetic recording material 2 and also analog information such as the owner's name, the address and the telephone number and the health examination number can be provided on the same side of the stripe of the magnetic recording material 2.

Figure 4:
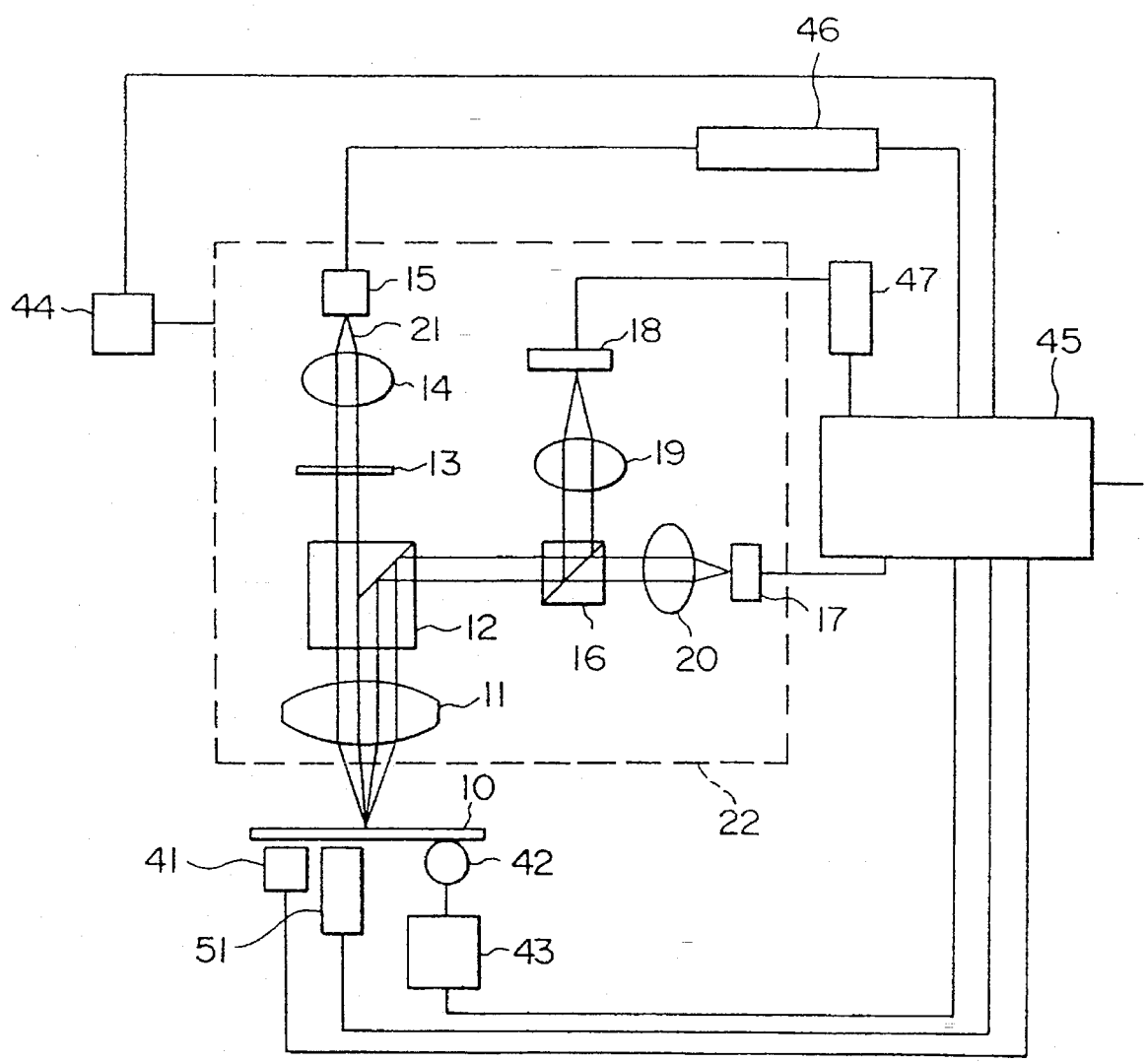
FIG. 4 is a diagram of optical, mechanical and electrical components of an information recording apparatus.

The method of recording information in the optical recording material of the present invention and reading the information will now be explained with reference to FIG. 4.

A laser beam 21 emitted from a semiconductor laser 15 is rendered a parallel light by a collimating lens 14 and the parallel light passes through a diffraction lattice 13, a polarization beam splitter 12 and an objective lens 11 and is focused on the optical recording material of an optical card 10. The reflected laser beam 21 passes through the polarization beam splitter 12 and is divided into two beams. Each beam passes through lens 19 and 20 and one beam reaches a radio frequency sensor (RF sensor) 18 while the other beam reaches an autofocusing/autotracking sensor (AF/AT sensor) 17. The RF sensor 18 is a sensor for measuring the change in reflectivity of the optical recording material and a data read sensor for reading information. Signals of the RF sensor and the AF/AT sensor are all controlled by control circuits 45.

For example, when the optical card is used as a purchase card, an encoder 46 converts the information such as article numbers, article names and prices provided from the control circuits 45 into binary signals suitable for recording and in accordance with the signals the laser beam is emitted to form a bit row in the optical recording material. In reading the information, the binary signals corresponding to the bit rows sent from the RF sensor 18 is fed to the control circuits 45 through a decoder 47. The optical card 10 moves in the X-axis direction by using a feeding roller 42 and a motor 43, and in the y-axis direction by the movement of an optical unit 22.

When the optical card has a magnetic recording material 2 as shown in FIGS. 3-(b) and 3-(c), a magnetic recording and reading device 41 is used for reading the information in the magnetic recording material 2 of the optical card. Further, when the optical card has an IC as shown in FIG. 3-(d), an IC reader writer 51 is used.

Figure 5:
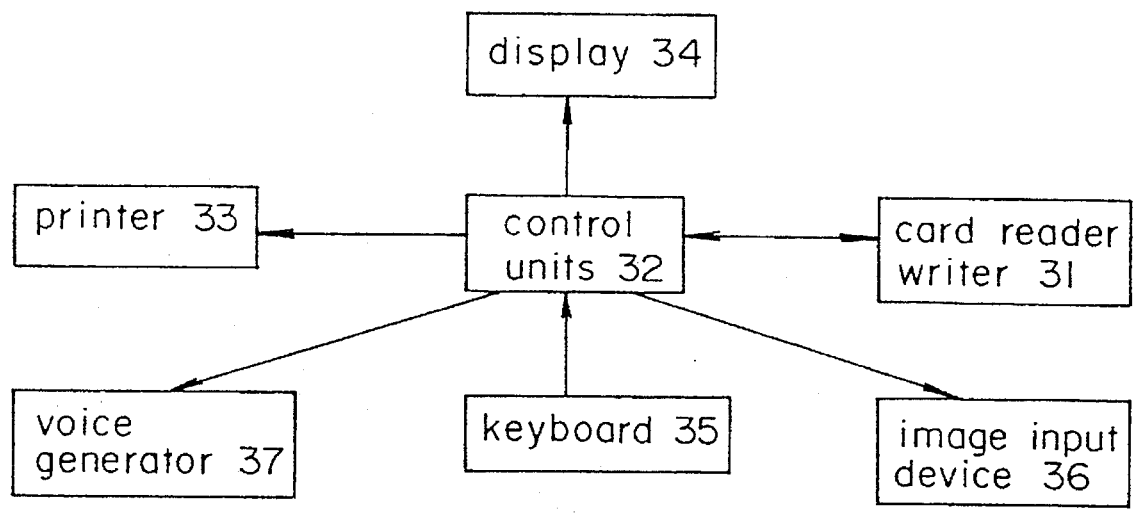
FIG. 5 is a block summarizing the use of an optical card of the present invention.

In FIG. 5 showing a block diagram for using an optical card 10, the card reader writer 31 is a device for recording information and reading the information recorded. The keyboard 35 is to input the purchased article number at shopping in a control unit 32. In order to output information such as a list of article numbers, article names and article prices, a printer 33 is connected to the control unit 32.

FIG. 6-(a) is a flow chart of this system.

With reference to FIGS. 5 and 6-(a), use of a purchase card is explained.

When an optical card is inserted into the card reader writer, retrieval of the code number from the optical recording material is conducted. Then, when the personal code number is inputted by a keyboard 35, the owner of the card is confirmed. After the confirmation of the owner, the information such as article numbers, article names and prices is immediately read from the ROM portion of the optical recording material and is shown on a display 34. Then, when the article number to be purchased is inputted by the keyboard 35, the article name and the price now purchased and its total amount of money are shown on the display 34 and, if necessary, the information is printed on a sheet of paper by a printer 33. Also, the purchase information at this time is recorded in the remaining add-on recording portion of the optical recording material, and the optical card is discharged. The information such as the article number and its quantity to be purchased may be forwarded to a shop by a telephone network or the printed list of the article numbers to be purchased may be forwarded to the shop by facsimile.

When the optical card is employed as, for example, a health examination card, an image input device 36 is additionally employed. Further, when the optical card is employed in a variety of systems using a voice card, a voice generator 37 is additionally employed.

With reference to FIG. 5, use of an IC optical card as a medical information card as shown in FIG. 3-(d) is explained.

A card reader writer 31 is an apparatus for recording and reading the information in an optical recording material and for recording, reading and erasing the information in IC by a laser beam. Medical information is inputted into a control part 32 through a keyboard 35. In order to input image information an image input device 36 which is typically a charge coupled device sensor, is provided. A printer 33 for outputting a variety of medical information recorded is connected with the control part 32.

One embodiment of using this system is shown by a flow chart in FIG. 6-(b). With reference to FIGS. 5 and 6-(b), use of a medical information card is explained. An optical IC card is inserted into a card reader writer 31 and the personal code number is inputted from the keyboard 35 to confirm the identification of the owner of the card in the IC. After the confirmation the necessary medical information stored is reproduced and outputted on a display 34 or by a printer 33. Doctors, nurses, or pharmacists can use the information in diagnosis and then the result of the medical examination, the kind and amount of drug to be prescribed and the medical fee are inputted from the keyboard 35 or an image input device 35 and are recorded in the IC or the optical recording material. The calculation of the medical fee is conducted in the IC to relieve the work load of the host computer. Finally the optical IC card is discharged from the card reader writer 31. A very large amount of information can be recorded on the optical recording material and accordingly, if necessary or desired, the information stored in the IC can be recorded and stored in the optical recording material. Thus, the newest data can be stored in the IC. Any time, if necessary, the information recorded in the optical IC card can be outputted on a sheet of paper by the printer 33.

It is preferred that the data to be recorded in an optical recording material and those in an IC be separated. Image information such as X-ray photographs, X-ray computerized tomographic images are preferably recorded on the optical recording material while information such as simple diagnosis results and medical fee are preferably memorized in the IC. Since the memory capacity of the IC is small, it is necessary to erase the information except the minimal necessary information.

Also, the optical IC card can be used as a personal information and identification card of a company which cover in one card all the information such as a face photograph, a family make-up, a record of attendance, an internal savings account and business experience. Further the optical IC card can be used as a banking card for recording the information of deposit and withdrawal and as a membership card for shopping such as a sports club membership card, golf club membership card, a leisure club membership card and a travelers' club membership card.

The method of reading the recorded information in a ROM optical card will now be explained with reference to FIGS. 7-(a) and 7-(b).

Numeral 61 is a light source and a variety of light sources can be employed and a typical light source is a laser or a light-emitting diode, and here a laser is employed. The laser beam emitted from a laser 61 is focused on the optical recording material of an optical card 10 through a focusing lens 63. The reflected laser beam is condensed through an objective lens 64 to a line sensor 62 and converted to binary electric signals and passes through a decoder 47 and reaches control circuit 20, resulting in reading the information in the optical recording material. Also the digital information can be converted to voice data by providing a voice converter and a voice generator with the control circuit.

The movement of the optical card 10 in the x-axis direction is controlled by a x-axis motor servo 67 and the optical card 10 itself is moved by a roller 66. The optical card 10 is moved in the y-axis direction by a roller 68 by controlling the light head 71 by a y-axis motor servo 69. The x-axis motor servo 67 and the y-axis motor servo 68 are controlled by the control circuits 20.

When the ROM optical card is a voice card, the recorded information is read by a modified apparatus as shown in FIG. 7-(b). The reflected laser beam is collected to a line sensor 62 and is demodulated by an eight to fourteen modulator 72 and passes through a decoder 48, a de-interleave 73 and a decoder 47 and is digital-to-analog converted by a digital-to-analog converter 74 to give audio output signals. Use of such a voice card is explained with reference to FIG. 5. In FIG. 5 numeral 31 is a card reader writer which reads the information recorded in the optical recording material of a voice card of the present invention, numeral 35 is a keyboard for inputting signals into a control unit 32, and numeral 37 is a voice generator for converting the audio output signals to voice. When a voice card is inserted into the card reader writer 31 where voice data are read and converted into audio output signals which are then carried to the voice generator 37. By inputting necessary signals from the keyboard 35, voice data can be controlled.

The following examples illustrate the present invention in more detail.

The diameter of the metallic particles in the metallic luster layer of an optical recording material and the average interparticle distance between two metallic particles were obtained as follows:

An optical recording material was embedded in an epoxy resin (product of Nissan EM Co., Ltd., tradename "Quetol-812") and cut into an ultrathin section by an ultramicrotome (manufactured by LKB Co., Ltd., tradename "LKB-V"). The ultrathin section was placed on a grid adhered with a collodion support film and carbon was vacuum evaporated on the ultrathin section to give a sample for microscopy. Photographs by a transmission electron microscope were taken under the follows conditions:

Electron microscope: H-500 manufactured by Hitachi, Ltd.

Accelerating voltage: 75 kV

Observation method: transmission electron microscopic method

The diameter of the metallic particles were measured by using the photographs.

The average interparticle distance between two metallic particles was calculated from the measurements of distances of 100 metallic particles.

Evaluation of the surface uniformity was conducted as follows:

Reflectivity shown by % was measured by a microdensitometer having an aperture of 1 μm×10 μm. Reflectivities were measured at 50 points (N) at 5 μm intervals. When the reflectivity at each point and the average value of the reflectivities are designated $D_i$ and $D$, respectively, the standard deviation G is represented by the following equation $$\sigma^2 = \Sigma(D_i - D)^2 / N$$

The uniformity of a metallic luster layer is compared by the standard deviation, and the uniformity is better with smaller standard deviations.

EXAMPLE 1

Chromium (III) phenyldiazosulfonate, cobalt (II) phenyldiazosulfonate and copper (I) phenyldiazosulfonate were prepared by reacting phenyldiazosulfonic acid with metal chromium, metal cobalt and metal copper, respectively.

Suspensions having the following ingredients were prepared.

| | |
|---|---|
| Each of the metal phenyldiazosulfonates as obtained above | 14 g |
| Polyisobutyrene | 7 g |
| Methylcyclohexane | 62 g |
| 1-Phenyl-3-pyrazolidone | 16 g |

The suspensions were rendered uniform by ball-milling for about 15 hours and passed through a filter having an average pore diameter of 1.5 μm to remove undispersed substances. Then the filtrate suspensions were uniformly coated on a 100 μm-thick polyethylene terephthalate film by a small-size applicator whose slit was selected so as to form a 9.5 μm-thick coating after drying, and dried at 22° C. and a relative humidity of 50% for about 12 hours.

Then silver was vacuum-evaporated on the surface of the dried coating under a vacuum of $10^{-6}$ mmHg at a rate of 1 Å per second to a thickness of 10 Å, followed by heating at 135° C. for 10 seconds by a block heater to give an optical recording material having a metallic luster layer in its surface.

The reflectivities of the optical recording materials thus obtained were measured and the results are as follows;

| Starting Material of Metallic Particle | | Reflectivity (%) |
|---|---|---|
| Chromium (III) | phenyldiazosulfonate | 38 |
| Cobalt (II) | phenyldiazosulfonate | 43 |
| Copper (I) | phenyldiazosulfonate | 39 |

Also the vertical sections of the optical recording materials thus obtained were observed by the transmission electron microscope. The diameters of the metallic particles in the metallic luster layer were as follows;

| Starting Material of Metallic Particle | | Diameter of Metallic Particles (nm) | Percentage of Diameter of Metallic Particles below 15 nm (%) |
|---|---|---|---|
| Chromium (III) | phenyldiazosulfonate | 5–40 | 5.8 |
| Cobalt (II) | phenyldiazosulfonate | 5–40 | 6.2 |
| Copper (I) | phenyldiazosulfonate | 5–40 | 6.5 |

Note: Metallic particles having a particle diameter of 5 nm or more were not found in the layer other than the metallic luster layer.

Further, the average interparticle distance between two metallic particles in the surface of the metallic luster layer was 5 nm to 9 nm with the three types of the optical recording materials.

Using a semiconductor laser beam having an emission wavelength of 830 nm and an emission output of 20 mW, static laser recording was conducted and as a result, all the optical recording materials could be recorded by laser pulses of 50 μsec.

EXAMPLE 2

The procedures of Example 1 were repeated except that sulfinic acid was employed instead of the phenyldiazosulfonic acid and hydroquinone was employed instead of the 1-phenyl-3-pyrazolidone.

The reflectivities of the optical recording materials thus obtained were as follows;

| Starting Material of Metallic Particle | | Reflectivity (%) |
|---|---|---|
| Chromium (III) | sulfinate | 25 |
| Cobalt (II) | sulfinate | 29 |
| Copper (I) | sulfinate | 21 |

The diameters of the metallic particles in the metallic luster layer were as follows;

| Starting Material of Metallic Particle | | Diameter of Metallic Particles (nm) | Percentage of Diameter of Metallic Particles above 40 nm (%) |
|---|---|---|---|
| Chromium (III) | sulfinate | 18–74 | 5.4 |
| Cobalt (II) | sulfinate | 18–74 | 7.9 |
| Copper (I) | sulfinate | 19–74 | 3.4 |

The average interparticle distance between two metallic particles in the surface of the metallic luster layer was 6 nm to 8 nm.

Using a semiconductor laser beam having an emission wavelength of 830 nm and an emission output of 20 mW, static laser recording was conducted and as a result, all the three types of the optical recording materials could be recorded by laser pulses of 100 μsec.

EXAMPLE 3

A suspension having the following ingredients was prepared.

| | |
|---|---|
| Silver behenate | 20 g |
| Polyvinyl butyral | 18 g |
| Phthalazone | 4 g |
| 2,2'-Methylenebis(4-ethyl-6-tert-butylphenol) | 9 g |
| Methyl ethyl ketone | 240 g |
| Toluene | 60 g |

The suspension was rendered uniform by ball-milling about 12 hours and then passed through a filter having an average pore diameter of 1.5 μm to remove undispersed substances. Under safety light the filtrate suspension was uniformly coated on a 100 μm-thick polyethylene terephthalate film by a small-size applicator whose slit was selected so as to obtain a 6 μm-thick coating after drying and dried at 22° C. at a relative humidity of 50% for about 12 hours to give an intermediate optical recording material (I).

One of the intermediate optical recording materials (I) thus obtained was immersed in an aqueous solution (1) having the ingredients as set forth below for 10 seconds, washed with water and dried in air and then in an aqueous solution (2) having the ingredients as set forth below for 10 seconds, washed with water and dried in air to give an intermediate optical recording material (II).

| | |
|---|---|
| Aqueous solution (1) | |
| Stannous chloride | 7 g |
| Distilled water | 200 ml |
| Concentrated hydrochloric acid | 4 ml |
| Aqueous solution (2) | |
| Palladium (II) chloride | 0.1 g |
| Distilled water | 200 ml |
| Concentrated hydrochloric acid | 5 ml |

The intermediate optical recording materials (I) and (II) were subjected to heating at 130° C. for 10 seconds to give optical recording materials (I) and (II), respectively. The intermediate optical recording material (I) was blackened while the optical recording material obtained from the intermediate optical recording material (II) had a silver luster layer in its surface of the coating and the reflectivity was 36%.

The diameter of the silver particles in the silver luster layer was in the range of 15 nm to 35 nm. The average interparticle distance between two silver particles in the surface of the silver luster layer was 6 nm.

Using a semiconductor laser beam having an emission wavelength of 830 nm, a beam diameter of 3 μm and an emission output of 10 mW, laser recording was conducted with the optical recording material by emitting pulses at a scanning rate of 40 cm per second. As a result, oval pits having a diameter vertical to the scanning direction of 3 μm and a diameter parallel to the scanning direction of 3.5 μm could be recorded.

Further, the optical recording material (II) after the laser recording was kept at 70° C. at a relative humidity of 80% for one week. As a result, hardly any change in the reflectivity, the shape of the pits and the appearance was observed and it was found that the optical recording material of the present invention had an excellent storage stability.

Furthermore, one of the intermediate optical recording materials (I) and one of the intermediate optical recording materials (II) were subjected to heating at 130° C. for 300 seconds. As a result, the entire surface of the coating of the intermediate optical recording material (I) was blackened, while the surface of the coating of the optical recording material obtained from the intermediate optical recording material (II) had a silver luster layer and the surface at the side of the substrate was blackened. The reflectivities were as follows;

| | Reflectivity (%) |
|---|---|
| Intermediate optical recording material (I) after heating | |
| Coating surface | 11 |
| Optical recording material | |
| Coating surface | 51 |
| Substrate surface | 10 |

Thus, the (X−Y)/(X+Y) value of the optical recording material was 0.67.

Using a semiconductor laser beam having an emission wavelength of 830 nm, a beam diameter of 3 μm and an output of 3 mW, laser recording was conducted with the optical recording material by emitting pulses at a scanning rate of 60 cm per second. As a result, oval pits having a diameter vertical to the scanning direction of 3 μm and a diameter parallel to the scanning direction of 3.5 μm could be recorded.

EXAMPLE 4

The surface of one of the same intermediate optical recording materials (I) as obtained in Example 3 was spin-coated with a solution having the ingredients as set forth below so as to obtain a 0.6 μm-thick coating after drying, dried at room temperature (22° C.) and vacuum-dried at 50° C. for 24 hours to give an intermediate optical recording material (II).

| | |
|---|---|
| Polyvinyl alcohol | 10 g |
| Sodium tetrachloroaurate (III) | 100 mg |
| Methyl alcohol | 20 ml |
| Distilled water | 500 ml |

The intermediate optical recording material (II) was subjected to heating at 130° C. for 10 seconds to give an optical recording material having a silver luster layer in its surface. The reflectivity was 45%. The same semiconductor laser beam recording as in Example 3 was conducted to form pits of 3 μm.

Further, the optical recording material after the laser recording was kept at 70° C. at a relative humidity of 80% for one week. As a result, hardly any change in the reflectivity, the shape of the pits and the appearance was observed and the optical recording material of the present invention was found to have an excellent storage stability.

Furthermore, one of the intermediate optical recording materials (II) was subjected to heating at 130° C. for 300 seconds to give an optical recording material having a reflectivity at the side of the coating of 51% and a reflectivity at the side of the substrate of 13%.

EXAMPLE 5

The same procedures as in Example 4 were repeated to give an intermediate optical recording material (II) except that 100 mg of mercury (II) acetate and 100 mg of hydroquinone were employed instead of the sodium tetrachloroaurate (III).

The intermediate optical recording material (II) was subjected to heating at 130° C. for 5 seconds to give an optical recording material having a silver luster layer in its surface. The reflectivity was 21%.

It was confirmed that the optical recording material thus obtained could be recorded by a laser beam in the same manner as in Example 3.

EXAMPLE 6

The same procedures as in Example 3 were repeated to give an intermediate optical recording material (II) except that 0.1 g of potassium tetraiodoplatinate (II) was employed instead of palladium (II) chloride in the aqueous solution (2).

The intermediate optical recording material (II) thus obtained was subjected to heating at 130° C. for 5 seconds to give an optical recording material having a silver luster layer in its surface. The reflectivity was 23%.

It was confirmed that the optical recording material thus obtained could be recorded by a laser beam in the same manner as in Example 3.

EXAMPLE 7

A suspension having the following ingredients was prepared.

| | |
|---|---|
| Silver behenate | 20 g |
| Polyvinyl butyral | 18 g |
| Phthalazone | 4 g |
| 2-Tert-butyl-6-(3-tert-butyl-2-hydroxy-5-methylbenzyl)-4-methyl-phenyl acrylate | 8 g |
| Methyl ethyl ketone | 185 g |
| Toluene | 55 g |
| Sodium bromide | 0.3 g |

The suspension was rendered uniform by ball milling for about 12 hours and then passed through a filter having an average pore diameter of 1.5 μm to remove undispersed substances.

In the same manner as in Example 3, the filtrate suspension was uniformly coated on the polyethylene terephthalate film so as to form a 11 μm-thick coating after drying and dried under safety light to give an intermediate optical recording material (I).

Then, in the same manner as in Example 3 palladium nuclei were formed on the surface of the coating to give an intermediate optical recording material (II).

Subsequently the intermediate optical recording material (II) thus obtained was subjected to heating at 150° C. for 10 seconds by a block heater to give an optical recording material having a silver luster layer in its surface.

Figure 1B:
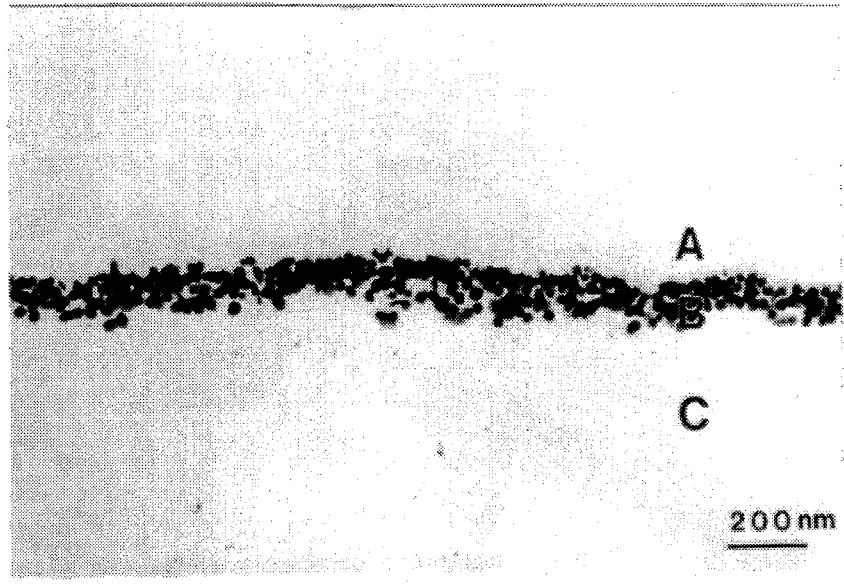

FIGS. 1-(a) and 1-(b) are transmission electron microscopic photographs of the optical recording material thus obtained. In FIGS. 1-(a) and 1-(b), A is an epoxy resin layer, B is a silver luster layer and C is a layer of the composition for the optical recording material.

The diameter of the silver particles in the silver luster layer was 15 nm to 50 nm and the percentage of diameters of the silver particles larger than 40 nm was at most 3%. The average distance between two silver particles in the surface of the silver luster layer was 7 nm.

It was confirmed that also the optical recording material could be recorded by a laser beam in the same manner as in Example 3.

EXAMPLE 8

The same procedures as in Example 7 for preparing an intermediate optical recording material (II) were repeated except that the suspension additionally had 0.2 g of 1,1,1', 1'-tetrabromo-o-xylene, the coating was dried at 50° C. for 10 minutes and then the intermediate optical recording material (I) was kept at 22° C. at a relative humidity of 50% and the entire procedures were conducted under safety lamp.

The intermediate optical recording material (II) was subjected to heating at 140° C. for 10 seconds to give an optical recording material. The reflectivity was 47%.

Using a He-Ne laser beam having an emission wavelength of 633 nm, a beam diameter of 3 m and an emission output of 3 mW at an emission pulse of 100 μsec, laser recording was conducted to form pits of 3 μm.

The diameter of the silver particles in the silver luster layer was 10 nm to 38 nm and the percentage of diameters of the silver particles larger than 15 nm was at most 6%. The average interparticle distance between two silver particles in the surface of the silver luster layer was 5 nm.

EXAMPLE 9

A suspension having the following ingredients was prepared in a dark room.

| | |
|---|---|
| Silver behenate | 20 g |
| Vinylchloride-vinyl acetate copolymer | 15 g |
| Phthalazone | 6 g |
| 2,2'-Methylenebis(4-tert-butyl-6-tert-butylphenol) | 10 g |
| Calcium iodide | 0.3 g |
| Cobalt iodide | 0.4 g |
| Methyl ethyl ketone | 200 g |
| Toluene | 50 g |

The same procedures as in Example 3 for preparing an intermediate optical recording material (II) were repeated using the suspension except that the entire procedures were conducted under safety light.

The intermediate optical recording material (II) was exposed to a 300 W high pressure mercury lamp for 10 seconds through a chromium mask bearing 2 μm-wide grooves at 10 μm-wide intervals and immediately the entire intermediate optical recording material was subjected to heating at 130° C. for 4 seconds to give an optical recording material having a silver luster layer with 2 μm-wide non-luster portions formed in the exposed areas in its surface. The non-luster portions were yellowish transparent and can be used as tracking guides. The reflectivity of the silver luster layer was 40%.

Laser recording was conducted by a testing machine for optical cards carring a semiconductor laser having an output of 10 mW at a scanning rate of 45 cm per second. As a result, pits were formed in the optical recording material and read.

Further, the optical recording material after the laser recording was kept at 70° C. at a relative humidity of 80% for one week. As a result, hardly any change in the reflectivity, the shape of the pits and the appearance was observed and the optical recording material of the present invention was found to have an excellent storage stability.

EXAMPLE 10

A solution having the following ingredients was prepared.

| | |
|---|---|
| Silver trifluoroacetate | 20 g |
| 2,2-Methylenebis(4-ethyl-6-tert-butylphenol) | 9 g |
| Methyl ethyl ketone | 200 g |
| Toluene | 60 g |
| Polycarbonate | 20 g |

The solution was rendered uniform by stirring for about one hour and then passed through a filter having an average pore diameter of 1.5 μm.

The filtrate solution was uniformly coated on a 100 μm-thick polyethylene terephthalate film by a small-size applicator whose slit was selected so as to form a 6 μm-thick coating after drying, and dried at 22° C. at a relative humidity of 50% to give an intermediate optical recording material (I).

Then palladium nuclei were formed on the surface of the coating of one of the intermediate optical recording materials (I) as obtained above by an electroless plating process, i.e., immersing the intermediate optical recording material (I) in an aqueous solution (1) as shown below for 10 seconds washing, the material (I) thus treated with water and drying the material (I) thus washed, and then immersing the material (I) thus obtained in an aqueous solution (2) as shown below for 10 seconds, washing the material (I) thus treated with water and drying the material (I) thus washed, in air to give an intermediate optical recording material (II).

| | |
|---|---|
| Aqueous solution (1) | |
| Activator Neoganth 834 (product of Japan Schering Co., Ltd.) | 40 ml |
| Distilled water | 956 ml |
| Sodium hydroxide | 3 g |
| Aqueous solution (2) | |
| Reducer Neoganth WA (product of Japan Schering Co., Ltd.) | 5 ml |
| Boric acid | 5 g |
| Distilled water | 950 ml |

Then the intermediate optical recording material (II) thus obtained was subjected to heating at 150° C. for 60 seconds to give an optical recording material having a silver luster layer in its surface. The reflectivity of the optical recording material thus prepared was 50.5%.

Figure 2A:
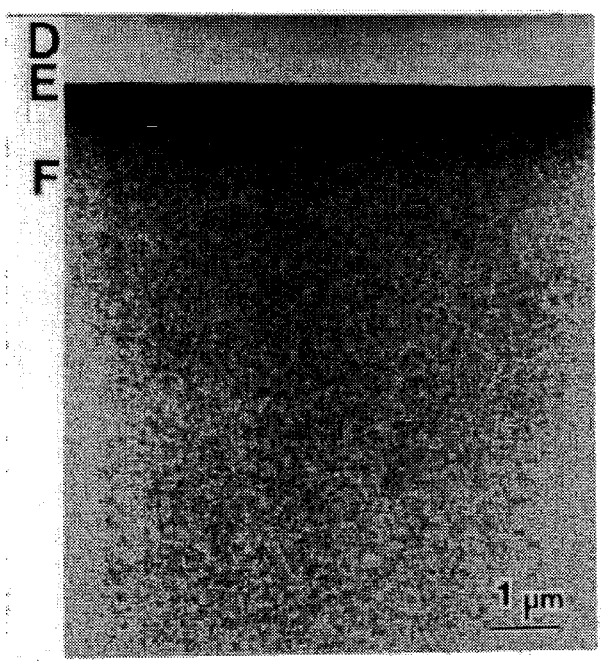
FIGS. 2-(a) and 2-(b) are transmission electron microscopic photographs of another optical recording material of the present invention at different magnifications.
Figure 2B:
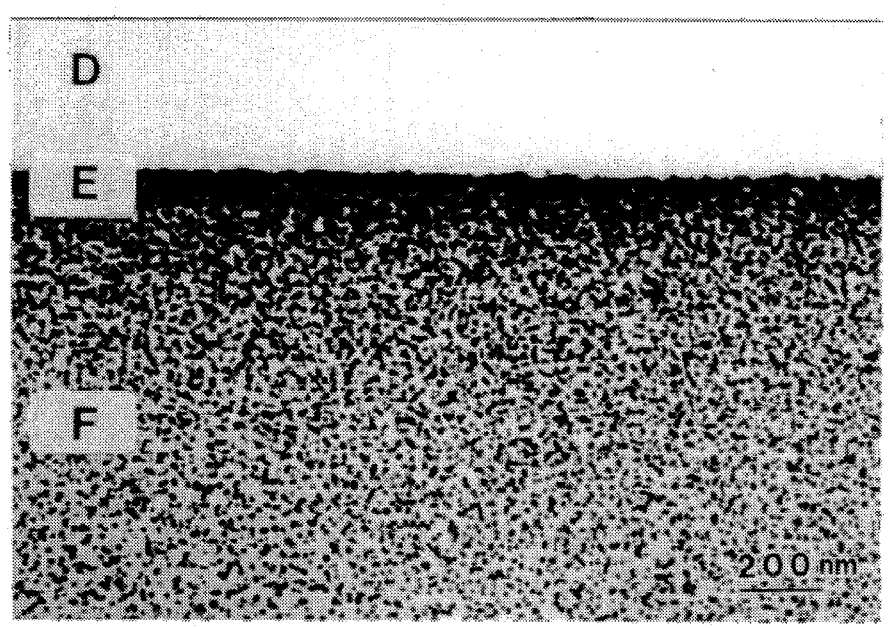

FIGS. 2-(a) and 2-(b) are transmission electron microscopic photographs of the optical recording material thus obtained. In FIGS. 2-(a) and 2-(b), D is an epoxy resin layer, E is a silver luster layer and F is a layer of the composition for the optical recording material.

On the other hand, when one of the intermediate optical recording material (I) was subjected to heating at 150° C. for 60 seconds, it turned reddish brown and the reflectivity was 8.5%.

The same laser beam recording as in Example 3 was conducted with the optical recording material to form pits of about 3 μm.

EXAMPLE 11

A solution consisting of the following ingredients was prepared.

| | |
|---|---|
| Silver trifluoroacetate | 20 g |
| 2,6-Di-tert-butyl-4-methylphenol | 9 g |
| Methyl ethyl ketone | 200 g |
| Toluene | 60 g |
| Polyvinyl butyral | 18 g |

An optical recording material having a silver luster layer on its surface was prepared in the same manner as in Example 10 except that the heating was conducted at 140° C. for 60 seconds. The reflectivity of the optical recording material was 62%.

The same laser beam recording as in Example 10 was conducted with the optical recording material and as a result, it was confirmed that pits could be formed.

EXAMPLE 12

The surface of the same intermediate optical recording material as obtained in Example 11 was contacted with hydrogen gas to reduce the silver trifluoroacetate in the surface of the intermediate optical recording material to form silver nuclei.

The intermediate optical recording material thus treated was subjected to heating at 150° C. for 80 seconds to give an optical recording material having a silver luster layer in its surface. The reflectivity was 50%.

The same laser beam recording as in Example 10 was conducted with the optical recording material and as a result, it was confirmed that pits could be formed.

EXAMPLE 13

A solution having the following ingredients was prepared.

| | |
|---|---|
| Silver heptafluorobutyrate | 20 g |
| Polyvinyl butyral | 18 g |
| 2-Tert-butyl-6-(3-tert-butyl-2-hydroxy-5-methylbenzyl)-4-methylphenyl acrylate | 8 g |
| Isopropyl alcohol | 185 g |
| Cyclohexane | 55 g |
| Sodium iodide | 0.3 g |
| Cobalt iodide | 0.3 g |

The solution was rendered uniform by stirring for about two hours and then passed through a filter having an average pore diameter of 1.5 μm.

The same procedures as in Example 10 for preparing the intermediate optical recording material (II) except that under safety light the coating of the filtrate solution on the substrate was conducted so as to form a 11 μm-thick coating after drying and dried so.

The intermediate recording material (II) was subjected to heating at 150° C. for 40 seconds by a block heater to give an optical recording material having a silver luster layer in its surface. The reflectivity was 75%.

Then a photomask was tightly placed on the surface of the coating of the optical recording material and the coating was irradiated through the photomask with a 300 W high pressure mercury lamp for two seconds and subsequently the entire optical recording material was heated at 150° C. for 25 seconds to give an optical material having a silver luster layer in its surface. The reflectivity at the exposed areas was 9.7%, while that at the unexposed areas was 58%.

The same laser beam recording as in Example 10 was conducted with the unexposed areas of the optical recording material and as a result, it was confirmed that pits could be formed.

EXAMPLE 14

A solution having the following ingredients was prepared.

| | |
|---|---|
| Silver trifluoroacetylacetonate | 20 g |
| Polyvinyl butyral | 18 g |
| 2-Tert-butyl-6-(3-tert-butyl-2-hydroxy-5-methylbenzyl)-4-methylphenyl acrylate | 8 g |
| Methyl ethyl ketone | 185 g |
| Toluene | 55 g |

The solution was rendered uniform by stirring for about two hours and then passed through a filter having a pore diameter of 1.5 μm. Under safety light the filtrate solution was uniformly coated on a 100 μm-thick polyethylene terephthalate film by a small-size blade coater to form a 10 μm-thick coating, and the coating was dried at 50° C. for 10 minutes to give an intermediate optical recording material (I). Then the intermediate optical recording material (I) was kept at 22° C. at a relative humidity of 50% under safety light.

Subsequently, palladium nuclei were formed on the surface of the coating of the intermediate optical recording material (I) by vacuum-evaporating palladium metal to give an intermediate optical recording material (II).

The intermediate optical recording material (II) was subjected to heating at 140° C. for 10 seconds by a roll heater to give an optical recording material having a silver luster layer in its surface. The reflectivity was 42%.

Using a He-Ne laser beam having an emission wavelength of 633 nm, a beam diameter of 3 μm and an emission output of 3 mW at a recording pulse of 100 μsec, laser recording was conducted to form pits of 3 μm.

EXAMPLE 15

A suspension having the following ingredients was prepared.

| | |
|---|---|
| Silver behenate | 20 g |
| Polyvinyl butyral | 18 g |
| Phthalazone | 4.3 g |
| 2,2'-Methylenebis(4-tert-butyl-6-tert-butylphenol) | 10 g |
| Methyl ethyl ketone | 20 g |
| Toluene | 60 g |

The suspension was rendered uniform by ball milling for about 12 hours and was passed through a filter having an average pore diameter of 1.5 μm to remove undispersed substances. Then the filtrate suspension was uniformly coated on a 125 μm-thick polyethylene terephthalate film as a substrate film by a small-size applicator whose slit was selected so as to give a 6 μm-thick coating after drying, and dried in air at room temperature (22° C.) to give an intermediate optical recording material (I).

Separately, the polyethylene terephthalate film as a substrate film was immersed in an aqueous solution (1) having the ingredients as shown below for 120 seconds, washed with water and dried in air and then immersed in an aqueous solution (2) having the ingredients as shown below for 120 seconds, washed with water and dried in air. The filtrate suspension was coated on the polyethylene terephthalate film thus treated in the same manner as described above to give an intermediate recording material (II).

| | |
|---|---|
| Aqueous solution (1) | |
| Stannous chloride | 2 g |
| Distilled water | 100 ml |
| Concentrated hydrochloric acid | 2 ml |
| Aqueous solution (2) | |
| Palladium (II) chloride | 0.1 g |
| Distilled water | 200 ml |
| Concentrated hydrochloric acid | 5 ml |

The intermediate optical recording materials (I) and (II) were subjected to heating at 130° C. for 200 seconds to give optical recording materials (I) and (II), respectively.

The optical recording material (I) was blackened and its reflectivity was 8%, while the optical recording material had silver luster at the interface between the substrate film and the coating and the reflectivities at the side of surface of the substrated film and at the side of the surface of the coating were 45% and 11%, respectively.

Using a semiconductor laser beam having an emission wavelength of 830 nm, a beam diameter of 3 μm and an emission output of 6 mW, laser recording was conducted with the optical recording material (II) by emitting pulses at a scanning rate of 80 cm per second. As a result, oval pits having a diameter vertical to the scanning direction of 3 μm and a diameter parallel to the scanning direction of 3.5 μm could be recorded and the recording of the pits was confirmed by an increase in reflectivity.

EXAMPLE 16

The surface of one of the same intermediate optical recording materials (I) as obtained in Example 15 was spin-coated with a solution having the following ingredients so as to obtain a 0.2 μm-thick coating after drying, at room temperature (22° C.) and vacuum-dried at 50° C. for 24 hours.

| | |
|---|---|
| Polyvinyl alcohol | 10 g |
| Sodium tetrachloroaurate (III) | 100 ml |
| Methyl alcohol | 20 ml |
| Distilled water | 1000 ml |

Then the same suspension as in Example 15 was uniformly coated on the surface of the coating as obtained above to give a 6 μm-thick coating and dried in air at room temperature (22° C.) to give an intermediate optical recording material.

The material thus obtained was subjected to heating at 130° C. for 30 seconds to give an optical recording material. The reflectivity at the side of the surface of the polyethylene terephthalate film was 46% while that at the side of the surface of the coating was 12%.

The same laser beam recording as in Example 15 was conducted and as a result, it was confirmed that pits could be formed.

EXAMPLE 17

A suspension having the following ingredients was prepared in a dark room.

| | |
|---|---|
| Silver behenate | 20 g |
| Vinyl chloride-vinyl acetate copolymer | 15 g |
| Phthalazone | 6 g |
| 2,2'-Methylenebis(4-tert-butyl-6-tert-butylphenyl) | 10 g |
| Calcium bromide | 0.3 g |
| Nickel iodide | 0.3 g |
| Methyl ethyl ketone | 200 g |
| Toluene | 50 g |

An intermediate optical recording material (II) was prepared using the suspension in the same manner as in Example 15 under safety light.

The intermediate optical recording material (II) was exposed to a 300 W high pressure mercury lamp for 10 seconds through a chromium mask bearing 2 μm-wide grooves at 10 μm-wide intervals and immediately the entire intermediate optical recording material was subjected to heating at 130° C. for 200 seconds to give an optical recording material having a silver luster layer with 2 μm-wide non-luster portions having a reflectivity of 13% formed in the exposed areas. The reflectivity of the silver luster layer was 33%.

Laser recording was conducted by a testing machine for optical cards carrying a semiconductor laser having an output of 10 mW at a scanning rate of 95 cm per second. As a result, pits could be formed in the optical recording material and read.

EXAMPLE 18

The surface of one of the same intermediate optical recording materials (II) as obtained in Example 17 was spin-coated with a solution having the following ingredients so as to form a 2 μm-thick coating after drying.

| | |
|---|---|
| Methyl methacrylate | 1 g |
| Methyl ethyl ketone | 100 g |
| Cyanine dyestuff | 0.1 g |

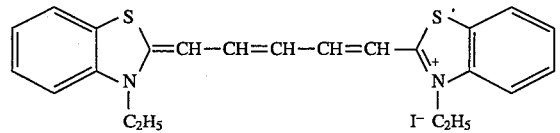

The coating was dried at 120° C. for only three seconds to form a silver luster layer alone and was cooled to room temperature (22° C.) before the formation of black silver particles.

Then the same laser beam recording as in Example 17 was conducted in the surface of the dyestuff coating layer. As a result, the recording of pits was confirmed in the silver luster layer by an increase in the reflectivity of the pits due to the sublimation or decomposition of the dyestuff coating layer.

EXAMPLE 19

Suspensions having the following ingredients were prepared.

| | |
|---|---|
| Silver behenate | 20 g |
| Polyvinyl butyral | 18 g |
| Phthalazone | 4 g |
| Each of reducing agents (1) to (13) as set forth in Table 1 | Amount as set forth in Table 1 |
| Methyl alcohol | 20 g |
| Methyl ethyl ketone | 200 g |
| Toluene | 60 g |
| Calcium bromide | 0.3 g |
| Cobalt (II) iodide | 0.3 g |

Each of the suspensions was rendered uniform by ball milling for about 12 hours and passed through a filter having an average pore diameter of 1.5 μm to remove undispersed substances.

Under safety light the filtrate suspension was uniformly coated on a 100 μm-thick polyethylene terephthalate film by a small-size applicator so as to obtain a 6 μm-thick coating after drying, and dried at 22° C. at a relative humidity of 50% for about 12 hours to give an intermediate optical recording material (I).

Then palladium nuclei were formed on the surface of the coating of the intermediate optical recording material (I) in the same manner as in Example 3 to give an intermediate optical recording material (II).

A mask film bearing a preformat was tightly placed on the coating of the intermediate optical recording material (II) thus obtained and the coating was irradiated through the mask film with a 500 W tungsten light for one second and subsequently the entire intermediate optical recording material (II) thus exposed was subjected to heating at 140° C. for 10 seconds to give an optical recording material having a surface of a high reflectivity in the unexposed areas and a surface of a low reflectivity in the exposed areas, accordingly having a preformat.

The uniformity of the surface of the optical recording materials is shown in Table 1.

TABLE 1

| Reducing Agent | Amount (mol)* | Standard Deviation ($\sigma$) |
|---|---|---|
| 1  $(CH_3)_3C$-, $HO$-, $CH_2$-, $C(CH_3)_3$, $C(CH_3)_3$, $OH$, $C(CH_3)_3$ (bisphenol structure) | 0.35 | 0.89 |
| 2  $CH_3$, $HO$-, $CH(C_2H_5)$-, $CH_3$, $OH$, $CH_3$, $CH_3$ | 0.36 | 0.94 |
| 3  $CH_3$, $HO$-, $CH_2$-, $C(CH_3)_3$, $OH$, $CH_3$, $CH_3$ | 0.34 | 0.95 |
| 4  $CH_3$, $HO$-, $CH_2$-, $C(CH_3)_3$, $OH$, $CH_3$, $C(CH_3)_3$ | 0.37 | 0.89 |
| 5  $(CH_3)_3C$-, $HO$-, $CH_2$-, tert-$C_5H_{11}$, $OH$, $C(CH_3)_3$, tert-$C_5H_{11}$ | 0.35 | 1.00 |
| 6  $CH_3$, $HO$-, $CH_2$-, $C(CH_3)_3$, $OH$, $C(CH_3)_3$, $C(CH_3)_3$ | 0.34 | 1.02 |
| 7  $(CH_3)_3C$-, $HO$-, $CH(C_2H_5)$-, $CH_3$, $OH$, $C(CH_3)_3$, $CH_3$ | 0.36 | 1.08 |

TABLE 1-continued

| Reducing Agent | Amount (mol)* | Standard Deviation (σ) |
|---|---|---|
| 8 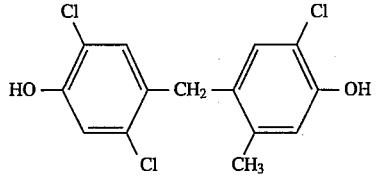 | 0.35 | 1.15 |
| 9 2-Methyl-6-tert-butyl-4-methylphenol | 0.37 | 2.85 |
| 10 2,2'-Methylenebis(4-methyl-6-tert-butylphenol) | 0.38 | 3.00 |
| 11 2-Tert-butyl-6-(3-tert-butyl-2-hydroxy-5-methylbenzyl)-4-methylphenyl acrylate | 0.35 | 2.96 |
| 12 p-Aminophenol | 0.36 | 3.25 |
| 13 1-Phenyl-3-pyrazolidone | 0.36 | 3.66 |

*mol per mol of silver behenate

EXAMPLE 20

The same procedures as in Example 19 for preparing optical recording materials having a preformat were repeated except that each of the suspensions having the following ingredients was employed.

| | |
|---|---|
| Silver behenate | 20 g |
| Polyvinyl butyral | 18 g |
| Phthalazone | 4 g |
| Each of reducing agents | Amount as |

| | |
|---|---|
| (1) to (8) as set forth in Table 2 | set forth in Table 2 |
| Methyl alcohol | 25 g |
| Methyl ethyl ketone | 190 g |
| Toluene | 55 g |
| Calcium bromide | 0.3 g |
| Cobalt (II) iodide | 0.2 g |

The uniformity of the surface of the optical recording materials is shown in Table 2.

TABLE 2

| Reducing Agent | Amount (mol)* | Standard Deviation (σ) |
|---|---|---|
| 1 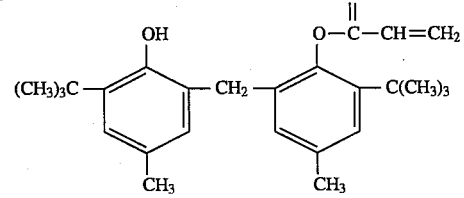 | 0.36 | 1.12 |
| 2 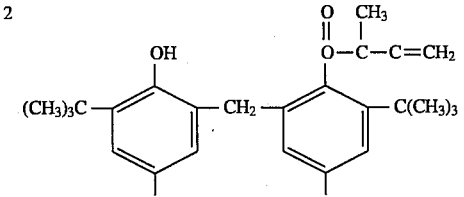 | 0.35 | 1.12 |
| 3 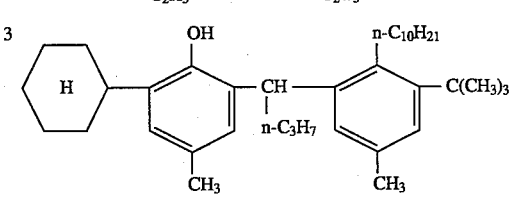 | 0.34 | 1.15 |

TABLE 2-continued

| Reducing Agent | Amount (mol)* | Standard Deviation (σ) |
|---|---|---|
| 4 [structure] | 0.37 | 1.18 |
| 5 [structure] | 0.35 | 1.16 |
| 6 [structure] | 0.35 | 1.18 |
| 7 [structure] | 0.34 | 1.30 |
| 8 [structure] | 0.36 | 1.46 |

*mol per mol of silver behenate

EXAMPLE 21

Suspensions having the following ingredients were prepared.

| | |
|---|---|
| Silver behenate | 25 g |
| Polyvinyl butyral | 19 g |
| Phthalazone | 5 g |
| Each of reducing agents (1) to (8) as set forth in Table 3 | Amount as set forth in Table 3 |
| Methyl alcohol | 20 g |
| Methyl ethyl ketone | 240 g |
| Toluene | 60 g |
| Calcium bromide | 0.2 g |
| Cobalt (II) iodide | 0.2 g |

The same procedures as in Example 19 for preparing optical recording materials having a preformat were repeated using each of the suspensions.

The uniformity of the surface of the optical recording materials is shown in Table 3.

TABLE 3

| | Reducing Agent | Amount (mol)* | Standard Deviation (σ) |
|---|---|---|---|
| 1 | Triethylene glycol bis[3-(3-tert-butyl-5-cyclohexyl-4-hydroxyphenyl)propionate] | 0.37 | 1.05 |
| 2 | 1,6-Hexanediol bis[3-(3,5-di-tert-butyl-4-hydroxyphenyl]propionate] | 0.36 | 1.08 |
| 3 | Pentaerythrityltertrakis[3-(3,5-di-tert-butyl-4-hydroxyphenyl)propionate] | 0.33 | 0.99 |
| 4 | Octadecyl-3-(3,5-di-tert-butyl-4-hydroxyphenyl)propionate | 0.35 | 1.07 |
| 5 | 3,5-Di-1-methylcyclohexyl-4-hydroxybenzyl phosphonate diethyl ester | 0.35 | 1.05 |
| 6 | N,N'-Hexamethylenebis(3,5-di-tert-butyl-4-hydroxyhydrocinnamamide) | 0.34 | 1.03 |
| 7 | N,N'-Hexamethylenebis(3-propyl-5-tert-butyl-4-hydroxyhydrocinnamamide) | 0.36 | 1.55 |
| 8 | 1,3,5-Trimethyl-2,4,6-tris(3-propyl-5-n-butyl-4-hydroxybenzyl)benezene | 0.36 | 1.55 |

*mol per mol of silver benehate

EXAMPLE 22

Suspensions having the following ingredients were prepared.

| | |
|---|---|
| Silver behenate | 20 g |
| Polyvinyl butyral | 18 g |
| Phthalazone | 4 g |
| Each of reducing agents (1) to (15) as set forth in Table 4 | Amount as set forth in Table 4 |
| Methyl ethyl ketone | 185 g |
| Toluene | 55 g |
| Sodium bromide | 0.3 g |
| 1,1,1',1'-Tetrabromo-o-xylene | 0.1 g |

The same procedures as in Example 19 for preparing intermediate optical recording materials (II) were repeated using each of the suspensions except that an aqueous ammonia solution of silver nitrate having the composition of 4 g of silver nitrate, 500 ml of distilled water and 50 ml of a 30% by weight aqueous ammonia solution was employed instead of the aqueous solution (2) containing palladium (II) chloride to form silver nuclei on the surface of the intermediate recording material (I).

A chromium mask bearing digital information was tightly placed on the coating of the intermediate optical recording material (II) thus prepared and the coating was irradiated through the mask with a 500 W tungsten lamp for 3 seconds at a distance of about 30 cm and subsequently the entire intermediate optical recording material (II) thus exposed was subjected to heating at 130° C. for 30 seconds to give an optical recording material having information, i.e., so-called ROM.

Using a reading machine carrying a semiconductor laser having an emission wavelength of 780 nm, bit error ratio BER was measured. The results are shown in Table 4.

TABLE 4

| Reducing Agent | Amount (mol)* | BER ($10^{-4}$) |
|---|---|---|
| 1  ![structure: 2-OH, 6-(CH₃)₃C, 4-CH₃ phenyl — CH₂ — 2-O-C(=O)-CH=CH₂, 6-C(CH₃)₃, 4-CH₃ phenyl] | 0.36 | 2.0 |
| 2  ![structure: 2-OH, 6-(CH₃)₃C, 4-C₂H₅ phenyl — CH₂ — 2-O-n-C₄H₉, 6-C(CH₃)₃, 4-CH₃ phenyl] | 0.35 | 1.8 |
| 3  ![structure: 2-OH, 6-cyclohexyl(H), 4-CH₃ phenyl — CH₂ — 2-O-C(=O)-CH=CH₂, 6-C(CH₃)₃, 4-CH₃ phenyl] | 0.35 | 1.7 |

TABLE 4-continued

| Reducing Agent | Amount (mol)* | BER (10⁻⁴) |
|---|---|---|
| 4 [structure: 2-(1-methyl-1-ethylpropyl)-6-[(2-n-pentyloxy-3-tert-butyl-5-methylphenyl)methyl]-4-methylphenol] | 0.34 | 2.0 |
| 5 [structure: bis-phenol methylene with methacrylate ester] | 0.36 | 1.7 |
| 6 [structure: bis-phenol with n-C₃H₇ methine bridge and acrylate ester] | 0.36 | 1.9 |
| 7 [structure: bis-phenol with n-C₃H₇ methine bridge and methacrylate ester, ethyl substituents] | 0.35 | 1.7 |
| 8 [structure: cyclohexyl phenol with n-C₄H₉ methine bridge, methacrylate ester, O-C₂H₅ substituent] | 0.35 | 1.5 |
| 9 [structure: bis-phenol with n-C₃H₇ methine bridge and cyclohexanecarboxylate ester] | 0.36 | 2.2 |
| 10 [structure: bis-phenol methylene with phenylacetate ester] | 0.35 | 2.6 |
| 11 Triethylene glycol bis[3-(3,5-di-tert-butyl-4-hydroxyphenyl)propionate] | 0.35 | 1.5 |

TABLE 4-continued

| | Reducing Agent | Amount (mol)* | BER ($10^{-4}$) |
|---|---|---|---|
| 12 | 1,6-Hexanediol bis[3-(3,5-dicyclehexyl-4-hydroxyphenol)propionate] | 0.36 | 1.2 |
| 13 | 2,4-Bis(n-octylthio)-6-(4-hydroxy-3,5-di-tert-buthylanilino)-1,3,5-triazine | 0.37 | 1.8 |
| 14 | 2,2-Thiodiethylenebis[3-(3,5-di-tert-butyl-4-hydroxyphenyl)propionate] | 0.35 | 1.4 |
| 15 | Octadecyl-3-(3-cyclohexyl-5-tert-butyl-4-hydroxyphenyl)propionate | 0.34 | 1.5 |
| 16 | 3,5-Di-tert-butyl-4-hydroxybenzyl phosphonate diethyl ester | 0.35 | 1.9 |
| 17 | Bis(3,5-di-tert-butyl-4-hydroxybenzyl phosphonate ethyl ester)calcium | 0.36 | 1.4 |
| 18 | Tris(3,5-di-tert-butyl-4-hydroxybenzyl) isocyanurate | 0.35 | 1.5 |
| 19 | N,N'-bis[3-(3,5-di-tert-butyl-4-hydroxyphenyl)propionyl]hydrazine | 0.37 | 1.6 |
| 20 | 2,6-Di-tert-butyl-4-methylphenol | 0.34 | 1.9 |
| 21 | 4,4'-Butylidenebis(3-methyl-6-tert-methylphenol) | 0.35 | 10 |
| 22 | Triethylene glycol bis(3,3-tert-butyl-5-methyl-4-hydroxyphenol) | 0.36 | 19 |
| 23 | N,N'-Dipropyl-p-phenylenediamine | 0.34 | 21 |
| 24 | p-Methylaminophenol sulfate | 0.35 | 33 |
| 25 | Hydroquinone | 0.35 | 26 |

*mol per mol of silver behenate

EXAMPLE 23

Suspensions having the following ingredients were prepared.

| | |
|---|---|
| Silver behenate | 20 g |
| Polyvinyl butyral | 18 g |
| Phthalazone | 4 g |
| 2,2'-Methylenebis(4-ethyl-6-tert-butylphenol) | 9 g |
| Methyl ethyl ketone | 200 g |
| Toluene | 60 g |
| Each of light absorbers (1) to (6) as set forth in Table 5 | 2 mg |
| Sodium bromide | 1 g |
| Dichloromethane | 5 g |
| Methanol | 1 g |

The same procedures as in Example 19 for preparing optical recording materials having a preformat were repeated using each of the suspensions except that the heating was conducted at 130° C. for 10 seconds instead of the heating at 140° C. for 10 seconds.

Then the same laser beam recording as in Example 3 was conducted to form pits. Also the C/N ratio of reproducing signals were measured and the bit error ratio (BER) was measured by an error detector with a reproducing power of 0.5 mW. The results are shown in Table 5.

The necessary minimum powers for forming pits by varying only the laser emission power at recording among the recording conditions are shown in Table 5.

Further, the acceleration test at 40° C. at a relative humidity of 90% under a 20,000 lux halogen lamp was conducted for 100 hours and the results are shown in Table 5.

A comparative optical recording material was prepared by repeating the above described procedures except that the light absorber was deleted from the suspension employed and the properties of the optical recording material thus obtained are also shown in Table 5.

TABLE 5

| Light Absorber | Initial Properties | | Properties after Acceleration Test | | Necessary Minimum |
|---|---|---|---|---|---|
| | C/N (dB) | BER ($10^{-5}$) | C/N (dB) | BER ($10^{-5}$) | Power (mW) |
| 1 Copper phthalocyanine | 52 | 2 | 51 | 2 | 1 |
| 2 Aluminum phthalocyanine | 53 | 2 | 52 | 2 | 1 |
| 3 Magnesium phthalocyanine | 51 | 3 | 51 | 3 | 2 |
| 4 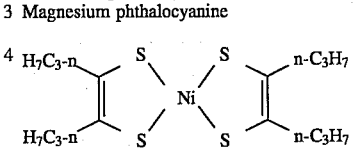 | 52 | 2 | 52 | 3 | 1 |

TABLE 5-continued

| Light Absorber | Initial Properties | | Properties after Acceleration Test | | Necessary Minimum |
| --- | --- | --- | --- | --- | --- |
| | C/N (dB) | BER ($10^{-5}$) | C/N (dB) | BER ($10^{-5}$) | Power (mW) |
| 5 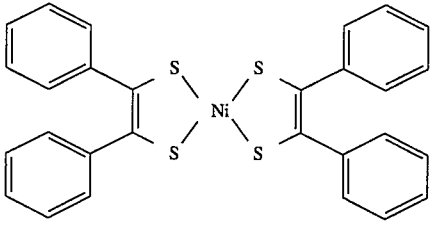 | 55 | 2 | 53 | 2 | 1 |
| 6 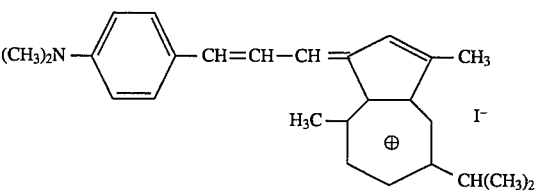 | 53 | 2 | 51 | 2 | 2 |
| 7 none | 43 | 8 | 39 | 16 | 5 |

EXAMPLE 24

The same procedures as in Example 14 were repeated to give an optical recording material except that a 100 μm-thick polyfluoroethylene sheet was employed as a substrate instead of the polyethylene terephthalate film.

Then the optical recording material was stamped out into a 10 mm×10 mm size and peeled from the substrate by a pair of tweezers. The same laser recording as in Example 14 was conducted by placing the optical recording material thus stamped out on the laser recording apparatus to form pits.

Further, the optical recording material was inserted between two polyvinyl chloride sheets for lamination and laminated. An optical card having an optical recording material was prepared by stamping out the laminated sheet by a stamper for cards.

EXAMPLE 25

One of the same intermediate recording materials (II) as obtained in Example 15 was further treated in the same aqueous solutions (1) and (2) in the same manner as in Example 15 to give an intermediate optical recording material (II') having palladium nuclei both at the interface between the substrate film and the coating and on the surface of the coating.

The intermediate optical recording material (II') thus prepared was subjected to heating at 130° C. for 200 seconds to give an optical recording material having silver luster layers both at the interface between the substrate film and the coating and on the surface of the coating. The reflectivities at the side of the substrate and at the side of the coating were 44% and 47%, respectively.

A 125 μm-thick polyethylene terephthalate film one surface of which had previously been coated with a urethane adhesive in a thickness of about 10 μm was laminated at the adhesive layer side on the optical recording material.

The same laser recording as in Example 15 was conducted and it was confirmed that both sides of the optical recording material thus obtain could be recorded.

EXAMPLE 26

A 10% by weight aqueous solution of sodium polyacrylate having a number average molecular weight of 15,000 was coated on a glass plate and dried in air at 50° C. for 12 hours to give a 7 μm-thick coating. Then the glass plate having the coating was immersed in a 5% by weight aqueous solution of silver nitrate for three minutes to convert the coating of sodium polyacrylate to a silver polyacrylate membrane and dried in air at 50° C. for 12 hours. Then the glass plate having the silver polyacrylate membrane was immersed in a 5% by weight aqueous solution of hydroquinone for three minutes and dried in air at 40° C. for 6 hours.

Palladium metal was vacuum-evaporated on the surface of the silver polyacrylate membrane thus treated in a thickness of 30 Å and the membrane thus obtained was subjected to heating at 135° C. for 100 seconds to form a silver luster layer in its surface. The reflectivity was 37%.

The same laser beam recording as in Example 3 was conducted and as a result, it was confirmed that pits could be formed.

EXAMPLE 27

A solution having the following ingredients was prepared.

| Sodium alginate | 20 g |
| --- | --- |
| Distilled water | 800 g |
| Isopropyl alcohol | 60 g |

The solution was rendered uniform by stirring for about one hour by stirring and then passed through a filter having an average pore diameter of 1.5 μm. The filtrate solution was uniformly coated on a 100 μm-thick polyethylene terephthalate film by a small-size applicator whose slit was selected so as to obtain a 6 μm-thick coating after drying and dried at 22° C. at a relative humidity of 50% for about 12 hours. Then the coating was immersed in an aqueous 0.1N silver nitrate solution for three minutes to convert the coating of the sodium alginate to a silver alginate membrane and dried in air at 50° C. for 12 hours to give intermediate optical recording materials (I).

One of the intermediate optical recording materials (I) was further treated with the same aqueous solutions (1) and (2) in the same manner as in Example 10 to give an intermediate optical recording material (II) having palladium nuclei in its surface.

Then the intermediate optical recording materials (I) and (II) were subjected to heating at 150° C. for 100 seconds. As a result, the entire surface of the intermediate optical recording material (I) was turned to be reddish brown and had a reflectivity of 8.5%, while the optical recording material obtained from the intermediate optical recording material (II) had a silver luster layer in its surface having a reflectivity of 50.5.

When the same laser beam recording as in Example 3 was conducted with the optical recording material thus obtained, pits of about 3 μm were formed.

The same procedures as described above were repeated except that sodium pectate was employed instead of the sodium alginate. As a result, it was confirmed that pits of about 3 μm were formed by the laser beam recording.

EXAMPLE 28

On the silver luster layer of the same optical recording material as obtained in Example 10 was tightly placed a chromium photomask bearing tracking guides of 3 μm-wide grooves at 12 μm-wide intervals, and then the silver luster layer was exposed to a light from a xenon flash lamp having an exposure energy of 50 J/cm$^2$ for 10 mseconds to form tracking guides having a low reflectivity of 24%.

EXAMPLE 29

The same procedures as in Example 8 for preparing intermediate optical recording materials (II) were repeated except that the thickness of the coating of the composition for the optical recording material was changed to 6 μm and the coating was dried at 55° C. for 10 minutes.

A photomask bearing data for a catalog of the numbers, names and prices of articles in a certain shop in dot rows with a preformat was tightly placed on one of the intermediate optical recording materials (II) which was then exposed to a 500 W tungsten light for one second through the photomask and heated at 130° C. for 10 seconds to give an optical recording material having a silver luster layer in its surface.

Then a 0.4 mm-thick polycarbonate sheet was laminated on the silver luster layer of the optical recording material with a urethane adhesive and a 0.25 mm-thick polyvinyl chloride sheet was laminated on the substrate with a urethane adhesive. The laminated product thus obtained was stamped out in the form of a card to give an optical card as a purchase card. Further, on the surface of the card the names of the card and the shop were printed.

The above described procedures were repeated except that the photomask bearing data for a catalog of documents and books in a certain library in bit rows was employed and as a result, a ROM optical card was obtained as a library card. Further on the surface of the card the names of the card and the library were printed.

EXAMPLE 30

On one of the same intermediate optical recording materials (II) as obtained in Example 29 was tightly placed a photomask bearing a preformat and through the photomask the optical recording material (II) was exposed to 500 W tungsten light for one second and then heated at 130° C. for 10 seconds to give an optical recording material having a silver luster layer in its surface.

Then a 0.4 mm-thick polycarbonate sheet was laminated on the silver luster layer of the optical recording material with a urethane adhesive and a 0.15 mm-thick polyvinyl chloride sheet was laminated on the substrate with a urethane adhesive.

A magnetic recording material and information such as a seal or a signature of the subject and an account number were adhered on to the polyvinyl chloride sheet and a 0.05 mm polyvinyl chloride film as a transparent protective film was laminated on the magnetic recording material and the information. Then the laminated product was stamped out in the form of a card to give an optical magnetic card as a banking card. Further on the card were printed the names of the card and the bank.

EXAMPLE 31

An IC chip of one chip type having a surface area of 20 mm$^2$ and a thickness of 0.3 mm in which a central processing unit (CPU) and an electrically erasable and programmable read only memory (EEPROM) were integrated was prepared. The reverse side of the chip was finished like a mirror surface. Then the IC chip was adhered to a module substrate with a urethane adhesive and the substrate was electrically connected with the IC chip by wire-bonding and the remaining portions of the IC chip and substrate were sealed with a polyurethane resin and further, the reverse side of the IC module was polished and rendered smooth. The thickness of the IC module thus obtained was 0.6 mm. A hole having the same size of the IC module was made in a 0.2 mm-thick polyvinyl chloride sheet and a 0.4 mm-thick polycarbonate sheet and in the hole between these two sheets the IC module was inserted with a urethane adhesive. Then the same optical recording material as obtained in Example 30 was inserted between these two sheets with a urethane adhesive and further, a 0.1 mm-thick polyvinyl chloride sheet was laminated on the entire surface of the 0.2 mm-thick polyvinyl chloride with an adhesive and the laminated product thus obtained was stamped out in the form of a card to give an optical IC card as a banking card.

What is claimed is:

1. An optical recording material comprising:
   (1) a thin film having a luster layer that is continuous and uniform in the plane of the thin film near a surface of said thin film and a layer contiguous to said luster layer, wherein said thin film comprises
      (A) a hydrophobic binding agent selected from the group consisting of polyvinyl butyral, polymethyl methacrylate, polycarbonate, vinyl chloride-vinyl acetate copolymer, and polyisobutylene, and
      (B) metallic particles having a diameter of 0.003 μm to 3 μm dispersed in thin said film wherein the density of said metallic particles is higher near at least one surface of said thin film, thereby forming said luster layer that is continuous and uniform in the plane of the thin film near said thin film surface, wherein said luster layer that is continuous and uniform in the plane of the thin film has a reflectivity which is 10 to 90%, and is higher than the reflectivity of the layer contiguous to said luster layer, and wherein each metallic particle has a nucleus and an outer coating, wherein the metal of said outer coating is silver and wherein said nucleus comprises a metal more precious than silver or an alloy, sulfide, or oxide of said metal more precious than silver, and (2) a transparent protective film, sheet, or plate laminated on the luster layer surface of the thin film.

2. The optical recording material of claim 1, wherein the reflectivity of said luster layer that is continuous and uniform in the plane of the thin film is 25 to 60%.

3. The optical recording material of claim 1, wherein the reflectivity of said luster layer that is continuous and uniform in the plane of the thin film and the reflectivity of the layer of said thin film contiguous to said luster layer that is continuous and uniform in the plane of the film have the following relationship:

$$0.03 \leq \frac{X-Y}{X+Y} \leq 0.9$$

wherein
X is the reflectivity of said luster layer that is continuous and uniform in the plane of the film; and
Y is the reflectivity of said layer contiguous to said luster layer that is continuous and uniform in the plane of the film.

4. The optical recording material of claim 3, wherein the reflectivity of the luster layer that is continuous and uniform in the plane of the thin film and the reflectivity of the layer contiguous to said luster layer that is continuous and uniform in the plane of the thin film have the following relationship:

$$0.2 \leq \frac{X-Y}{X+Y} \leq 0.8$$

wherein
X is the reflectivity of the luster layer that is continuous and uniform in the plane of the thin film; and
Y is the reflectivity of the layer contiguous to said luster layer that is continuous and uniform in the plane of the thin film.

5. The optical recording material of claim 1, wherein the metal more precious than silver is palladium, platinum, gold, rhodium, ruthenium, thallium or mercury.

6. The optical recording material of claim 5, wherein the metal more precious than silver is palladium.

7. The optical recording material of claim 5, wherein the metal more precious than silver is gold.

8. The optical recording material of claim 5, wherein the metal more precious than silver is platinum.

9. The optical recording material of claim 1, wherein the hydrophobic binding agent is insoluble in water of about 60° C.

10. The optical recording material of claim 1, wherein the thin film additionally comprises a silver halide or a silver halide-forming agent.

11. The optical recording material of claim 10, which contains a silver halide-forming agent and wherein the silver halide-forming agent is a hydrogen halide, a metal halide, a halogen molecule, an organic N-haloamide, a diarylhalomethane, an ammonium halide, an organic halide compound of an element of Groups IV, V and VI of Periodic Table or a dihalide of triphenyl phosphite.

12. The optical recording material of claim 11, wherein the silver halide-forming agent is a metal halide.

13. The optical recording material of claim 1, wherein the thin film additionally comprises a light absorber in the wavelength region of a semiconductor laser.

14. The optical recording material of claim 13, wherein the light absorber is a phthalocyanine dye.

15. The optical recording material of claim 13, wherein the light absorber is an azulenium dye.

16. The optical recording material of claim 13, wherein the light absorber is a nickel-dithiol complex.

17. The optical recording material of claim 1, which additionally comprises a thin layer of a light absorber in the wavelength region of a semiconductor laser on its surface.

18. The optical recording material of claim 17, wherein the thickness of the thin layer of the light absorber is 500 Å to 5 μm.

19. The optical recording material of claim 1, wherein the thin film additionally comprises a toning agent.

20. The optical recording material of claim 19, wherein the toning agent is phthalazone.

21. The optical recording material of claim 1, wherein the thin film of the hydrophobic binding agent comprises an anti-fogging agent.

22. The optical recording material of claim 21, wherein the anti-fogging agent is 1,1,1',1'-tetrabromo-o-xylene.

23. The optical recording material of claim 1, wherein the thickness of the optical recording material is 1 to 20 μm.

24. The optical recording material of claim 1, which is provided on a substrate.

25. The optical recording material of claim 24, wherein the substrate is a film, sheet or plate of a metal, glass or plastic.

26. The optical recording material of claim 24, wherein a film or sheet of a plastic is laminated on the substrate.

27. The optical recording material of claim 1, wherein the information to be read is prerecorded in the optical recording material.

28. The optical recording material of claim 27, wherein the information to be read is prerecorded in a part of the optical recording material.

29. The optical recording material of claim 27, wherein the information to be read is prerecorded in the entire optical recording material.

30. An optical card having the optical recording material of claim 1.

31. The optical card of claim 30, wherein information to be read is prerecorded in the optical recording material.

32. The optical card of claim 31, wherein the information to be read is prerecorded in a part of the optical recording material.

33. The optical card of claim 30 additionally comprising analog information.

34. The optical card of claim 33, wherein the analog information is to identify the owner of the optical card.

35. The optical card of claim 33, wherein the optical recording material is provided on one surface of the optical card and the analog information is provided on the other surface of the optical card.

36. The optical card of claim 30 further comprising a magnetic recording material.

37. The optical card of claim 36, wherein the optical recording material is provided on one surface of the optical card and the magnetic recording material is provided on the other surface of the optical card.

38. The optical card of claim 36, wherein the optical recording material is provided on one surface of the optical card and analog information and magnetic recording material are provided on the other surface of the optical card.

39. The optical card of claim 36, wherein information to be read is prerecorded in the magnetic recording material.

40. The optical card of claim 30 further comprising an integrated circuit.

* * * * *